US008624908B1

(12) United States Patent
Knee et al.

(10) Patent No.: US 8,624,908 B1
(45) Date of Patent: Jan. 7, 2014

(54) SYSTEMS AND METHODS OF TRANSITIONING FROM BUFFERING VIDEO TO RECORDING VIDEO

(75) Inventors: Robert A. Knee, Lansdale, PA (US); Michael L. Craner, Chester Springs, PA (US)

(73) Assignee: Rovi Guides, Inc., Santa Clara, CA (US)

( * ) Notice: Subject to any disclaimer, the term of this patent is extended or adjusted under 35 U.S.C. 154(b) by 951 days.

(21) Appl. No.: 12/215,690

(22) Filed: Jun. 27, 2008

(51) Int. Cl.
*G06F 13/00* (2006.01)
*G09G 5/36* (2006.01)

(52) U.S. Cl.
USPC .......................................... 345/537; 345/547

(58) Field of Classification Search
USPC ........................................ 345/537, 557, 558
See application file for complete search history.

(56) References Cited

U.S. PATENT DOCUMENTS

| | | |
|---|---|---|
| 1,611,241 A | 12/1926 | Sanford |
| 1,639,409 A | 8/1927 | Johnson et al. |
| 1,743,968 A | 1/1930 | Hafield |
| 1,775,946 A | 9/1930 | Reid |
| 1,868,701 A | 7/1932 | Goerland |
| 1,915,443 A | 6/1933 | Pelouch |
| 1,938,130 A | 12/1933 | Ayer et al. |
| 1,949,761 A | 3/1934 | Rea |
| 1,972,181 A | 9/1934 | Chambers |
| 1,995,377 A | 3/1935 | Creveling |
| 2,074,570 A | 3/1937 | Smith et al. |
| 2,082,521 A | 6/1937 | Schneider et al. |
| 2,205,667 A | 6/1940 | Plummer et al. |
| 2,220,297 A | 11/1940 | Smith |
| 2,284,533 A | 5/1942 | Neuman |
| 2,357,355 A | 9/1944 | Penney |
| 2,833,449 A | 5/1958 | Morton |
| 2,928,574 A | 3/1960 | Wagner |
| 2,935,375 A | 5/1960 | Boucher |
| 3,029,957 A | 4/1962 | Sundholm |
| 3,512,340 A | 5/1970 | Golucket et al. |

(Continued)

FOREIGN PATENT DOCUMENTS

| | | |
|---|---|---|
| DE | 44 40 419 | 5/1996 |
| EP | 073964 A2 | 3/1983 |

(Continued)

OTHER PUBLICATIONS

"Advanced Analog Systems—Addressable Terminals" General Instrument Corp. of Horsham, Pennsylvania (URL:http//www.gi.com/BUSAREA/ANALOG/TERMINAL/WATCH/watch.html) Printed from the Internet on Mar. 4, 1999.

(Continued)

*Primary Examiner* — Jacinta M Crawford
(74) *Attorney, Agent, or Firm* — Ropes & Gray LLP

(57) ABSTRACT

Systems and methods for transitioning from buffering video to recording video. The control application receives a video and causes the video to be buffered until it detects a buffer full condition. Upon receiving the buffer full condition, the control application causes the media recorder to begin recording the newly received video as a recording, and designates the buffered video as part of the recording. In one method, the control application can be set to either record or play when the buffer becomes full. In other methods, the control application prompts the user for input indicating whether the video should be recorded or played when the buffer becomes full. In still other methods, the control application alerts the user as to how long a program may be paused before the buffer will become full.

32 Claims, 18 Drawing Sheets

(56) References Cited

U.S. PATENT DOCUMENTS

| | | |
|---|---|---|
| 3,745,751 A | 7/1973 | Zey et al. |
| 4,070,424 A | 1/1978 | Olson et al. |
| 4,113,151 A | 9/1978 | Brown et al. |
| 4,141,698 A | 2/1979 | Kihlstedt et al. |
| 4,142,654 A | 3/1979 | Doubleday et al. |
| 4,257,540 A | 3/1981 | Wegmann et al. |
| 4,264,924 A | 4/1981 | Freeman |
| 4,264,925 A | 4/1981 | Freeman et al. |
| 4,355,415 A | 10/1982 | George et al. |
| 4,573,072 A | 2/1986 | Freeman |
| 4,602,279 A | 7/1986 | Freeman |
| 4,605,964 A | 8/1986 | Chard |
| 4,664,298 A | 5/1987 | Shew |
| 4,694,490 A | 9/1987 | Harvey et al. |
| 4,706,121 A | 11/1987 | Young |
| 4,718,107 A | 1/1988 | Hayes |
| D295,599 S | 5/1988 | Shew |
| 4,847,698 A | 7/1989 | Freeman |
| 4,847,700 A | 7/1989 | Freeman |
| 4,857,999 A | 8/1989 | Welsh |
| 4,885,139 A | 12/1989 | Sparks et al. |
| 4,893,752 A | 1/1990 | Spink et al. |
| 4,908,707 A | 3/1990 | Kinghorn |
| 4,930,158 A | 5/1990 | Vogel |
| 4,945,563 A | 7/1990 | Horton et al. |
| 4,957,512 A | 9/1990 | Denisov et al. |
| 4,959,720 A | 9/1990 | Duffield et al. |
| 4,977,455 A | 12/1990 | Young |
| 5,038,211 A | 8/1991 | Hallenbeck |
| 5,047,867 A | 9/1991 | Strubbe et al. |
| 5,068,733 A | 11/1991 | Bennett |
| 5,109,279 A | 4/1992 | Ando |
| 5,151,789 A | 9/1992 | Young |
| 5,172,413 A | 12/1992 | Bradley et al. |
| 5,187,589 A | 2/1993 | Kono et al. |
| 5,195,134 A | 3/1993 | Inoue et al. |
| 5,200,822 A | 4/1993 | Bronfin et al. |
| 5,210,611 A | 5/1993 | Yee et al. |
| 5,223,924 A | 6/1993 | Strubbe |
| RE34,340 E | 8/1993 | Freeman |
| 5,241,428 A | 8/1993 | Goldwasser et al. |
| 5,253,066 A | 10/1993 | Vogel |
| 5,277,339 A | 1/1994 | Shew et al. |
| 5,285,284 A | 2/1994 | Takashima et al. |
| 5,295,310 A | 3/1994 | Eriksson |
| 5,296,931 A | 3/1994 | Na et al. |
| 5,308,589 A | 5/1994 | Yung |
| 5,323,234 A | 6/1994 | Kawasaki |
| 5,335,277 A | 8/1994 | Harvey et al. |
| 5,345,430 A | 9/1994 | Moe |
| 5,353,121 A | 10/1994 | Young et al. |
| 5,364,457 A | 11/1994 | Cameron |
| 5,371,551 A | 12/1994 | Logan et al. |
| 5,410,344 A | 4/1995 | Graves et al. |
| 5,412,720 A | 5/1995 | Hoarty |
| 5,416,508 A | 5/1995 | Sakuma et al. |
| 5,442,389 A | 8/1995 | Blahut et al. |
| 5,459,522 A | 10/1995 | Pint |
| 5,479,266 A | 12/1995 | Young et al. |
| 5,479,268 A | 12/1995 | Young et al. |
| 5,483,278 A | 1/1996 | Strubbe et al. |
| 5,485,197 A | 1/1996 | Hoarty |
| 5,485,219 A | 1/1996 | Woo |
| 5,517,257 A | 5/1996 | Dunn et al. |
| 5,524,195 A | 6/1996 | Clanton, III et al. |
| 5,532,754 A | 7/1996 | Young et al. |
| 5,534,911 A | 7/1996 | Levitan |
| 5,537,141 A | 7/1996 | Harper et al. |
| 5,539,449 A | 7/1996 | Blahut et al. |
| 5,539,822 A | 7/1996 | Lett |
| 5,550,576 A | 8/1996 | Klosterman |
| 5,553,220 A * | 9/1996 | Keene .................. 345/520 |
| 5,559,548 A | 9/1996 | Davis et al. |
| 5,559,549 A | 9/1996 | Hendricks et al. |
| 5,568,272 A | 10/1996 | Levine |
| 5,583,561 A | 12/1996 | Baker et al. |
| 5,583,563 A | 12/1996 | Wanderscheid et al. |
| 5,583,653 A | 12/1996 | Timmermans et al. |
| 5,585,838 A | 12/1996 | Lawler et al. |
| 5,585,858 A | 12/1996 | Harper et al. |
| 5,589,892 A | 12/1996 | Knee et al. |
| 5,592,551 A | 1/1997 | Lett et al. |
| 5,599,508 A | 2/1997 | Martinelli et al. |
| 5,600,364 A | 2/1997 | Hendricks et al. |
| 5,602,582 A | 2/1997 | Wanderscheid et al. |
| 5,603,751 A | 2/1997 | Ackerson |
| 5,629,733 A | 5/1997 | Youman et al. |
| 5,630,119 A | 5/1997 | Aristides et al. |
| 5,631,995 A | 5/1997 | Weissensteiner et al. |
| 5,632,007 A | 5/1997 | Freeman |
| 5,648,824 A | 7/1997 | Dunn et al. |
| 5,654,748 A | 8/1997 | Matthews, III |
| 5,654,886 A | 8/1997 | Zereski, Jr. et al. |
| 5,657,072 A | 8/1997 | Aristides et al. |
| 5,657,414 A | 8/1997 | Lett et al. |
| 5,659,367 A | 8/1997 | Yuen |
| 5,666,645 A | 9/1997 | Thomas et al. |
| 5,684,525 A | 11/1997 | Klosterman |
| 5,694,163 A | 12/1997 | Harrison |
| 5,694,381 A | 12/1997 | Sako |
| 5,699,107 A | 12/1997 | Lawler et al. |
| 5,717,452 A | 2/1998 | Janin et al. |
| 5,724,091 A | 3/1998 | Freeman et al. |
| 5,727,060 A | 3/1998 | Young |
| 5,732,216 A | 3/1998 | Logan et al. |
| 5,745,710 A | 4/1998 | Clanton, III et al. |
| 5,751,282 A | 5/1998 | Girard et al. |
| 5,752,159 A | 5/1998 | Faust et al. |
| 5,754,771 A | 5/1998 | Epperson et al. |
| 5,758,257 A | 5/1998 | Herz et al. |
| 5,760,821 A | 6/1998 | Ellis et al. |
| 5,768,528 A | 6/1998 | Stumm |
| 5,778,182 A | 7/1998 | Cathey et al. |
| 5,781,226 A | 7/1998 | Sheehan |
| 5,781,246 A | 7/1998 | Alten et al. |
| 5,790,198 A | 8/1998 | Roop et al. |
| 5,790,202 A | 8/1998 | Kummer et al. |
| 5,796,952 A | 8/1998 | Davis et al. |
| 5,801,787 A | 9/1998 | Schein et al. |
| 5,802,284 A | 9/1998 | Karlton et al. |
| 5,805,155 A | 9/1998 | Allibhoy et al. |
| 5,805,763 A | 9/1998 | Lawler et al. |
| 5,805,804 A | 9/1998 | Laursen et al. |
| 5,808,608 A | 9/1998 | Young et al. |
| 5,809,204 A | 9/1998 | Young et al. |
| 5,812,123 A | 9/1998 | Rowe et al. |
| 5,812,205 A | 9/1998 | Milnes et al. |
| 5,812,937 A | 9/1998 | Takahisa et al. |
| 5,818,438 A | 10/1998 | Howe et al. |
| 5,819,019 A | 10/1998 | Nelson |
| 5,819,156 A | 10/1998 | Belmont |
| 5,822,123 A | 10/1998 | Davis et al. |
| 5,828,945 A | 10/1998 | Klosterman |
| 5,838,314 A | 11/1998 | Neel et al. |
| 5,843,210 A | 12/1998 | Paranjpe et al. |
| 5,850,218 A | 12/1998 | LaJoie et al. |
| 5,855,652 A | 1/1999 | Talley |
| 5,900,867 A | 5/1999 | Schindler et al. |
| 5,917,138 A | 6/1999 | Taylor |
| 5,940,572 A | 8/1999 | Balaban et al. |
| 5,945,988 A | 8/1999 | Williams et al. |
| 5,959,592 A | 9/1999 | Petruzzelli |
| 5,963,264 A | 10/1999 | Jackson |
| 5,963,645 A | 10/1999 | Kigawa et al. |
| 5,970,486 A | 10/1999 | Yoshida et al. |
| 5,973,683 A | 10/1999 | Cragun et al. |
| 5,977,964 A | 11/1999 | Williams et al. |
| 5,987,213 A | 11/1999 | Mankovitz et al. |
| 5,991,498 A | 11/1999 | Young |
| 5,991,799 A | 11/1999 | Yen et al. |
| 5,995,155 A | 11/1999 | Schindler et al. |
| 6,002,394 A | 12/1999 | Schein et al. |
| 6,005,561 A | 12/1999 | Hawkins et al. |
| 6,005,631 A | 12/1999 | Anderson et al. |

(56) References Cited

U.S. PATENT DOCUMENTS

| | | | |
|---|---|---|---|
| 6,020,880 | A | 2/2000 | Naimpally |
| 6,020,883 | A | 2/2000 | Herz et al. |
| 6,038,367 | A | 3/2000 | Abecassis |
| 6,057,872 | A | 5/2000 | Candelore |
| 6,057,890 | A | 5/2000 | Virden et al. |
| 6,091,884 | A | 7/2000 | Yuen et al. |
| RE36,801 | E | 8/2000 | Logan et al. |
| 6,133,910 | A | 10/2000 | Stinebruner |
| 6,141,488 | A | 10/2000 | Knudson et al. |
| 6,157,413 | A | 12/2000 | Hanafee et al. |
| 6,160,726 | A | 12/2000 | Mori et al. |
| 6,163,316 | A | 12/2000 | Killian |
| 6,172,674 | B1 | 1/2001 | Etheredge |
| 6,177,931 | B1 | 1/2001 | Alexander et al. |
| 6,208,335 | B1 | 3/2001 | Gordon et al. |
| 6,208,799 | B1 | 3/2001 | Marsh et al. |
| 6,233,389 | B1 | 5/2001 | Barton et al. |
| 6,267,802 | B1 | 7/2001 | Baldrey et al. |
| 6,275,648 | B1 | 8/2001 | Knudson et al. |
| 6,324,338 | B1 | 11/2001 | Wood et al. |
| 6,326,982 | B1 | 12/2001 | Wu et al. |
| 6,327,418 | B1 | 12/2001 | Barton |
| 6,442,332 | B1 | 8/2002 | Knudson et al. |
| 6,473,559 | B1 | 10/2002 | Knudson et al. |
| 6,486,892 | B1 | 11/2002 | Stern |
| 6,505,348 | B1 | 1/2003 | Knowles et al. |
| 6,564,005 | B1 | 5/2003 | Berstis |
| 6,601,074 | B1 | 7/2003 | Liebenow |
| 6,611,842 | B1 | 8/2003 | Brown |
| 6,670,971 | B1 | 12/2003 | Oral |
| 6,721,954 | B1 | 4/2004 | Nickum |
| 6,727,914 | B1 | 4/2004 | Gutta |
| 6,744,967 | B2 | 6/2004 | Kaminski et al. |
| 6,760,537 | B2 | 7/2004 | Mankovitz |
| 6,817,492 | B1 | 11/2004 | Smith |
| 6,974,494 | B1 | 12/2005 | Zahedi |
| 7,088,910 | B2 | 8/2006 | Potrebic et al. |
| 7,096,486 | B1 | 8/2006 | Ukai et al. |
| 7,185,355 | B1 | 2/2007 | Ellis et al. |
| 7,519,268 | B2 | 4/2009 | Juen et al. |
| 7,978,218 | B2 * | 7/2011 | Biagiotti et al. ............ 348/180 |
| 2002/0059599 | A1 | 5/2002 | Schein et al. |
| 2002/0174424 | A1 | 11/2002 | Chang et al. |
| 2002/0174430 | A1 | 11/2002 | Ellis et al. |
| 2002/0191954 | A1 | 12/2002 | Beach et al. |
| 2002/0194596 | A1 | 12/2002 | Srivastava |
| 2003/0005445 | A1 | 1/2003 | Schein et al. |
| 2003/0009766 | A1 | 1/2003 | Marolda |
| 2003/0118323 | A1 | 6/2003 | Ismail et al. |
| 2003/0228140 | A1 * | 12/2003 | Bullock et al. ............... 386/125 |
| 2004/0139853 | A1 | 7/2004 | Bologa et al. |
| 2005/0204388 | A1 | 9/2005 | Knudson et al. |
| 2005/0240962 | A1 | 10/2005 | Cooper et al. |
| 2005/0240968 | A1 | 10/2005 | Knudson et al. |
| 2005/0273819 | A1 | 12/2005 | Knudson et al. |
| 2006/0140584 | A1 | 6/2006 | Ellis et al. |
| 2006/0267995 | A1 * | 11/2006 | Radloff et al. ............... 345/530 |
| 2007/0204308 | A1 | 8/2007 | Nicholas et al. |

FOREIGN PATENT DOCUMENTS

| | | |
|---|---|---|
| EP | 0 572 090 | 12/1993 |
| EP | 0 682 452 | 11/1995 |
| EP | 0 836 320 | 4/1998 |
| EP | 0 854 645 | 7/1998 |
| EP | 0921682 A2 | 6/1999 |
| EP | 0 940 983 | 9/1999 |
| EP | 1014715 A2 | 6/2000 |
| GB | 556939 A | 10/1943 |
| GB | 2 227 622 | 8/1990 |
| GB | 2 229 595 | 9/1990 |
| GB | 2 346 251 | 8/2000 |
| JP | 8130517 A | 5/1996 |
| JP | 10257400 A | 9/1998 |
| JP | 11261917 A | 9/1999 |
| JP | 11308561 A | 11/1999 |
| JP | 2000-138886 | 5/2000 |
| JP | 2000-224533 | 8/2000 |
| JP | 2000-235546 | 8/2000 |
| JP | 2000-306314 | 11/2000 |
| JP | 2001-088372 | 4/2001 |
| JP | 2001-165669 | 6/2001 |
| JP | 2001-167522 | 6/2001 |
| JP | 2001-257950 | 9/2001 |
| WO | WO-88/04507 | 6/1988 |
| WO | WO-9219380 A1 | 11/1992 |
| WO | WO-93/23957 A1 | 11/1993 |
| WO | WO-94/14284 | 6/1994 |
| WO | WO-95/32587 | 11/1995 |
| WO | WO-96/26605 | 8/1996 |
| WO | WO-96/34491 | 10/1996 |
| WO | WO-96/36172 | 11/1996 |
| WO | WO-96/37075 | 11/1996 |
| WO | WO-96/41478 | 12/1996 |
| WO | WO-9641470 A1 | 12/1996 |
| WO | WO-97/13368 | 4/1997 |
| WO | WO-97/46943 | 12/1997 |
| WO | WO-97/47124 | 12/1997 |
| WO | WO-97/48230 | 12/1997 |
| WO | WO-97/49237 | 12/1997 |
| WO | WO-99/04561 | 1/1998 |
| WO | WO-9809219 A1 | 3/1998 |
| WO | WO-98/17064 | 4/1998 |
| WO | WO-98/43183 | 10/1998 |
| WO | WO-99/03267 | 1/1999 |
| WO | WO-9935827 A1 | 7/1999 |
| WO | WO-9937045 A1 | 7/1999 |
| WO | WO-99/45700 | 9/1999 |
| WO | WO-99/52279 | 10/1999 |
| WO | WO-9960493 A1 | 11/1999 |
| WO | WO-99/66725 | 12/1999 |
| WO | WO-9965237 A1 | 12/1999 |
| WO | WO-00/04706 | 1/2000 |
| WO | WO-0004709 A1 | 1/2000 |
| WO | WO-00/07368 | 2/2000 |
| WO | WO-00/08850 | 2/2000 |
| WO | WO-00/08851 | 2/2000 |
| WO | WO-00/08852 | 2/2000 |
| WO | WO-00/16548 | 3/2000 |
| WO | WO-0011869 A1 | 3/2000 |
| WO | WO-0013416 A1 | 3/2000 |
| WO | WO-0016336 A1 | 3/2000 |
| WO | WO-00/28739 | 5/2000 |
| WO | WO-00/58833 | 10/2000 |
| WO | WO-00/58967 | 10/2000 |
| WO | WO-00/59214 | 10/2000 |
| WO | WO-00/59223 | 10/2000 |
| WO | WO-00/62298 | 10/2000 |
| WO | WO-00/62299 | 10/2000 |
| WO | WO-00/62533 | 10/2000 |
| WO | WO-00/67475 | 11/2000 |
| WO | WO-0110128 A1 | 2/2001 |
| WO | WO-0111865 A1 | 2/2001 |
| WO | WO-01/22729 | 3/2001 |
| WO | WO-01/46843 | 6/2001 |
| WO | WO-01/47238 | 6/2001 |
| WO | WO-01/47249 | 6/2001 |
| WO | WO-01/47257 | 6/2001 |
| WO | WO-01/47273 | 6/2001 |
| WO | WO-01/47279 | 6/2001 |
| WO | WO-01/76239 | 10/2001 |
| WO | WO-01/76248 | 10/2001 |
| WO | WO-02/78317 | 10/2002 |

OTHER PUBLICATIONS

"CNN Tech: Sonicblue revives Replay TV", artciles.cnn.com, Sep. 10, 2001, retrieved from the internet http://artciles.cnn.com/2001-09-10/tech/replay.tv.idg_1_replaytv-sonicblue-digital-video?_s=PM:TECH.

"Digital Video Broadcasting (DVB); DVB specification for data broadcasting", European Telecommunications Standards Institute, Draft EN 301 192 V1.2.1 (Jan. 1999).

(56) References Cited

OTHER PUBLICATIONS

"DirecTV Digital Satellite Receiver—Operating Instructions," Sony Electronics Inc. (2001).
"DirecTV Receiver—Owners Manual," DirecTV, Inc. (2002).
"DirecTV Receiver with TiVo Digital Satellite Receiver/Recorder SAT-T60—Installation Guide," Sony Corporation (2000).
"DirecTV Receiver with TiVo Installation Guide," Philips (2000).
"DirecTV Receiver with TiVo Viewers Guide" (1999, 2000).
"DishPro Satellite System—User's Guide," Dish Network (undated).
"Electronic Programme Guide (EPG); Protocol for a TV Guide using electronic data transmission" by European Telecommunication Standards Institute, May 1997, Valboone, France, publication No. ETS 300 707.
"Fall 2001 TiVo Service Update with Dual Tuner!" TiVo Inc. (2001).
"PTV Recorder Setup Guide," Philips (2000).
"RCA Satellite Receiver User's Guide," Thomson Multimedia Inc. (2001).
"Rewind, replay and unwind with new high-tech TV devices," by Lawrence J. Magid, LA Times. This document was printed from the Internet on Jun. 6, 1999 and bears a date of May 19, 1999.
"Start Here," Sony, TiVo and DirecTV (undated).
"Windows 98 Feature Combines TV, Terminal and the Internet," New York Times, Aug. 19, 1998.
Hofmann, Neumann, Oberlies, and Schadwinkel, "Videotext Programmiert Videorecorder," Rundfunktechnische Mitteilungen, Nov.-Dec. 1982, pp. 254-257.
SONICblue Incorporated: Reply TV 4000 User Guide 12.17, Chapter Five: Networking, Sep. 10, 2011; retrieved from the internet: http://www.digitalnetworksna.com/support/replytv/downloads/ReplyTV4000UserGuide.1 2.17.pdf.
User's Guide RCA Color TV with TV Plus + Guide, 1997.

\* cited by examiner

1600

1601 You have just paused this program.

This program may only be paused for 37 minutes.

You have configured your system to automatically designate the buffered video as a recording and begin recording the newly received video if you do not resume by that time.

However, you may optionally choose to automatically begin playing from the beginning of the buffer if you do not resume by that time. Would you like to change the setting for this time only?

1602 NO – Use the present system configuration (Designate the buffered video as a recording and begin recording the newly received video).

1603 YES – Change the setting for this time only (Play from the beginning of the buffer).

Third Watch  7:00 p   7:05p ▌▌   12 WGN   8:00 p

SYSTEMS AND METHODS OF TRANSITIONING FROM BUFFERING VIDEO TO RECORDING VIDEO

BACKGROUND OF THE INVENTION

This invention is directed to buffering video on media recorders. Media recorders may buffer received video in a playback control buffer (also known as a live-off-disk buffer or trick-play buffer) for the purposes, among others, of enabling a user to pause, rewind, and fast forward videos (trick-play functions) in real-time during viewing. For various reasons, the storage capacity of a playback control buffer (hereinafter referred to simply as a buffer) may be relatively small when compared to the overall storage capacity of the media recorder. If video is played or paused long enough, the buffer will eventually become full resulting in a less than optimal user experience. For example, in the circumstance where the buffer becomes full while a video program is playing, a user may lose the ability to rewind to the beginning of the program (e.g., if the program is longer than the buffer length at the given bitrate of the program). In the circumstance where a buffer becomes full when video is paused by a user, a control application (e.g., an interactive media guidance application) may automatically unpause the video and begin playing the buffered video from the point at which it was paused. In either case, the user receives a less-than-optimal user experience and may even miss some or all of the program he was viewing. Thus, there is a need in the art for a solution which enables a user to play or pause a video for an amount of time that is more in line with the amount of storage space on his system (rather than for an arbitrary amount of time), without necessarily increasing the size of the buffer.

SUMMARY OF THE INVENTION

This invention is directed to methods of and systems for buffering video as it is received by a media recorder. In one exemplary embodiment, when the buffer becomes full, the buffered video (i.e., the video that has already been stored in the buffer) is automatically designated as a recording, and the newly received video (i.e., the video that is currently being received by the media recorder) is automatically recorded to that recording. If a user decides to resume playback (where the video was paused when the buffer became full) or rewind (where the video was playing when the buffer became full), the video will play or rewind, respectively, from the recording just as it would have played or rewound from the buffer had it not become full.

In some embodiments, the user may be alerted upon pausing as to how long the video may be paused, and/or may be given an option to choose what should happen once the buffer becomes full. In other embodiments, the user may be alerted when the buffer is almost full, and/or may be given an option as to what should happen once it becomes full. In either embodiment, where the user is given such an option, he or she may be presented with one or more alternatives to recording the video once the buffer becomes full (e.g., to begin playing the buffered video from the beginning of the buffer, or to begin overwriting the earliest buffered video in the buffer, without ever resuming playback).

In all cases, the term "full" as used herein should be understood to include anything greater than 50 percent full, up to and including 100 percent full. Depending upon several factors including, but not limited to, the relative sizes of the buffer and recorded video space, the relative read and write speeds of the buffer and recorded video space, and the bit rate of the video, it may be desirable to initiate action (e.g. resume playback, or begin recording the newly received video) prior to the buffer becoming 100 percent full.

It should also be understood that a "full" buffer may be defined in several different ways without departing from the scope of the invention. One such example concerns circular buffers. Circular buffers are well-known in the art. When a circular buffer reaches an end, it circles back and continues recording at the beginning. Thus, a "full" circular buffer may be reasonably defined in more than one way. In one definition, a circular buffer may be considered full when it reaches one end (i.e. the point at which newly received video may not be buffered without overwriting video which has already been buffered). In another definition, a circular buffer may be considered full when it reaches the point at which the video is paused. It should be understood, however, that the present invention may be applied to any type of buffer that has a finite capacity.

The term "buffering" is used herein to denote the temporary storing of data to the buffer, while the term "recording" is used to denote the saving and treatment of data as a recorded program.

Likewise, it should be understood that the term "designating as a recording" has been used for clarity only. The meaning of "designating as a recording" as used herein only denotes that data once included the buffer is, through any means possible, used to create a recording, such as by moving the data, copying the data, or redesignating the data as a recording. In practice, this may be accomplished without any moving of data, but rather, through the manipulation of pointers (e.g., a logical move), changes to the file allocation table, or any other means known to those skilled in the art of computer programming. The claimed invention is not dependent on any one means of moving, copying, designating, or allocating memory, and should not be limited thereto. Rather, the claimed invention uses the term "designating as a recording" to incorporate any method of making a recording that is comprised, in whole or in part, of data that was once included in the buffer.

BRIEF DESCRIPTION OF THE DRAWINGS

The above and other features of the present invention, its nature and various advantages will be more apparent upon consideration of the following detailed description, taken in conjunction with the accompanying drawings, and in which:

FIG. 16 shows an illustrative display screen showing a dialog box overlay, with user input prompt, activated when the video is first paused, in accordance with one embodiment of the present invention;

DETAILED DESCRIPTION

Although the embodiments described below may refer to recording in broadcast digital or analog television systems, it is to be clearly understood that the systems and methods of the invention may be used with any suitable video or audio content (e.g., on-demand or recorded content) in any suitable media system (e.g., radio-frequency broadcast, cable, satellite, on-demand, and IPTV system) in which video or audio content is received and displayed simultaneously by a user device.

Figure 1:
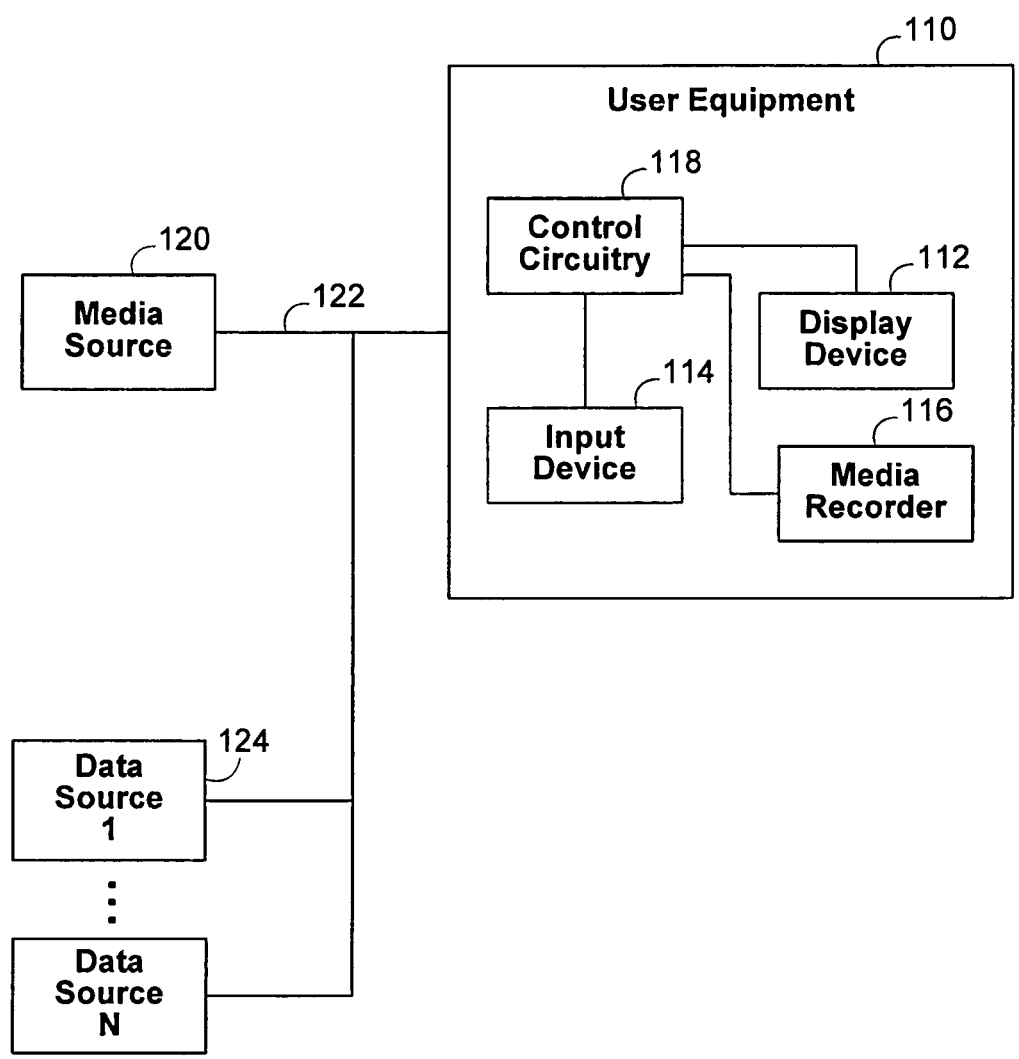
FIG. 1 is a diagram of an illustrative interactive media distribution system, in accordance with one embodiment of the present invention.

FIG. 1 shows an illustrative interactive media distribution system 100 in accordance with one embodiment of the invention. User equipment 110 receives media in the form of signals from media source 120 over communications path 122. In practice there may be multiple media sources 120 and user equipment 110, as well as multiple communication paths 122, but only one of each has been shown in FIG. 1 to avoid over-complicating the drawing.

Media source 120 may be any suitable media source such as, for example, a cable system head end, satellite media distribution facility, media broadcast facility, internet protocol television (IPTV) head end, on-demand server (e.g., VOD server), website, game service provider (e.g., for online gaming), switched digital video (SDV) system (e.g., comprising SDV manager, edge-resource manager, and edge-QAM subsystems), or any other suitable facility or system for originating or distributing media. Media source 120 may be configured to transmit signals over any suitable communications path 122 including, for example, a radio-frequency broadcast path, a satellite path, a fiber-optic path, a cable path, an Internet path, or any other suitable wired or wireless path. The signals may carry any suitable media such as, for example, television programs, games, music, news, web services, video, or any other suitable media. In some embodiments, media source 120 may include control circuitry for executing the requests of a trick-play client or a control application (e.g., an interactive media guidance application) implemented in, for example, user equipment 110 or a VOD server.

User equipment 110 may include television equipment such as a television, set-top box, recording device, video player, user input device (e.g., remote control, keyboard, mouse, touch pad, touch screen or voice recognition interface), or any other device suitable for providing an interactive media experience and buffering and recording media. For example, user equipment 110 may include a DCT 2000, 2500, 5100, 6208 or 6412 set-top box provided by Motorola, Inc. In some embodiments, user equipment 110 may include computer equipment, such as a personal computer with a television card (PCTV). In some embodiments, user equipment 110 may include a home theatre consumer electronic device such as, for example, a gaming system (e.g., X-Box, PlayStation, or GameCube) or a portable consumer electronic device, such as a portable DVD player, a portable gaming device, a cellular telephone, a PDA, a music player (e.g., MP3 player), or any other suitable home theatre or portable device.

In the example of FIG. 1, user equipment 110 includes at least control circuitry 118, display device 112, user input device 114, and a media recorder 116, which may be implemented as separate devices or as a single device. An interactive media guidance application may be implemented on user equipment 110 to provide media guidance functions to the user for media displayed on display device 112. In some embodiments, the interactive media guidance application may be or may include an interactive television application, a trick-play client, or any other application for providing media features to the user.

Display device 112 may be any suitable device such as, for example, a television monitor, a computer monitor, or a display incorporated in user equipment 110 (e.g., a cellular telephone or portable music player display). Display device 112 displays the media transmitted by media source 120 over path 122, and the displays of a trick-play client or control application. Display device 112 may also be configured to provide for the output of audio.

Media recorder 116 may be or may include a hard drive (e.g., one or more ATA, SCSI, IDE, or IEEE 1394 drives), digital video recorder (DVR), personal video recorder (PVR), DVD-recorder, compact disc recorder, or any other device capable of buffering and recording media content. Control circuitry 118 may access buffered or recorded content (e.g., programs and movies) on media recorder 116 and cause the content to be presented on display device 112 at any suitable time. Media recorder 116 may include one or more tuners, and may be configured to buffer media as the user receives it with user equipment 110 (e.g., buffer the currently tuned channel) to provide trick-play functions for the user. In some embodiments, the media recorder 116 may be at a remote location, for example a server co-located with media source 120 or data source 124.

A hard disk and other storage in media recorder 116 may be used to support databases (e.g., a database of media guidance information for recorded programs). A hard disk or other storage in media recorder 116 may also be used to record media such as television programs or video-on-demand content or other content provided to media recorder 116.

In some embodiments, media recorder 116 may include IR communications circuitry or other suitable communications circuitry for communicating with a remote control (e.g., with user input device 114). Media recorder 116 may also include dedicated buttons and a front-panel display. The front-panel display may, for example, be used to display the current channel to which the recording device is tuned.

In some embodiments, media recorder 116 may be a network recording device that is located outside of user equipment 110. For example, the network recording device may be incorporated in media source 120 (e.g., at the head end of a cable plant or VOD server), data source 124, an Internet server (not shown), a hard drive on a home computer (not shown), or any other suitable device. In some embodiments, the network recording device may be a stand-alone device (e.g., a commercial network recording device, or a DVR device in a home or neighborhood network). The network recording device may receive instructions to perform recordings from a control application implemented on any of a plurality of instances of user equipment 110.

User input device 114 may be any suitable device for interfacing with the control application. For example, user input device 114 may be a remote control, keyboard, mouse, touch pad, touch screen or voice recognition interface. User input device 114 may communicate with user equipment 110 and control circuitry 118 using any suitable communications link. For example, user input device 114 may use an infra-red (IR), radio-frequency, Bluetooth, wireless (e.g., 802.11), wired, or any other suitable communications link. The information received by user input device 114 may either be classified as a source selection command or a guidance application navigation command. A source selection command may include a channel change selection, video-on-demand selection, digital video recorder selection, or any suitable selection that causes the user to view content different than the content the user is currently viewing. A guidance application navigation command may include any suitable command that allows the user to change the information displayed in an interactive media guidance application.

Control circuitry 118 is adapted to receive user inputs from input device 114 and execute the instructions of the control application. Control circuitry 118 may include one or more tuners (e.g., analog or digital tuners), encoders and decoders (e.g., MPEG decoders), processors (e.g., Motorola 68000 family processors, or MIPS family processors), memory (e.g., RAM and hard disks), communications circuitry (e.g., cable modem circuitry), input/output circuitry (e.g., graphics circuitry), connections to the various devices of user equipment 110, and any other suitable component for providing analog or digital media programming, program recording, and interactive media guidance features. In some embodiments, control circuitry 118 may be included as part of one of the devices of user equipment 110 such as, for example, part of display 112 or any other device (e.g., a set-top box, television and video player). As already mentioned, control circuitry 118 may include memory such as random-access memory for use when executing applications. Nonvolatile memory may also be used to store a boot-up routine or other instructions. In other embodiments, control application instructions may be executed in other suitable stand alone hardware.

Control circuitry 118 may direct tuners to tune, acquire, and decode any suitable content accessible by user equipment 110. For example, user equipment 110 may include both an analog tuner used to acquire analog television signals and a digital tuner used to acquire and decode digital television signals. Control circuitry 118 may cause one or more frames of video (and accompanying audio) to be buffered in memory, or to be buffered or recorded by media recorder 116, at any suitable time. In addition, memory or media recorder 116 may include one or more pre-stored buffers (e.g., circular buffers) of audio or video, graphics, advertising, or any other suitable content. Control circuitry 118 may cause the buffered or recorded frames to be displayed or presented on display device 112 at any suitable time (e.g., after some user input from user input device 114).

In some embodiments, user equipment 110 may also include graphics circuitry (e.g., incorporated within control circuitry 118). The graphics circuitry may include video and/or audio transcoding circuitry, one or more graphics processors, memory, and various display outputs (e.g., S-Video and composite video outputs). The graphics circuitry may also include video compression and scaling codecs or circuitry to scale the input from the tuners (or from some other device, such as media recorder 116) to a resolution or size other than the input's native resolution or size. For example, using the graphics circuitry, the input to the tuners may be displayed at a smaller size on display device 112 than their native size in order for program listings information to be presented with the tuner content on the same display screen. As another example, the graphics circuitry may present full-motion or still frame thumbnail windows corresponding to one or more tuner inputs on the same display screen. The graphics circuitry may scale one video input at a time or scale more than one video input simultaneously. For example, in user equipment with two tuners the inputs of both of the tuners may be scaled simultaneously so that these inputs may be displayed together on the same display screen in real-time (perhaps with program listings information, content suggestions, or other suitable information).

Any suitable number of users may have equipment, such as user equipment 110, connected to media source 120 and data sources 124. A single user may also have multiple instances of user equipment 110. However, for the clarity of the figure, the equipment of only a single user is shown. The equipment of the plurality of users may be connected to media source 120 and data sources 124 using a cable television network, a satellite television network, a local area network (LAN), a wireless network, the Internet (e.g., using a DOCSIS modem), or any other suitable means. In some embodiments, the equipment of the plurality of users may be connected to each other using any suitable means.

User equipment 110 may receive interactive media guidance application data from one or more data sources 124. Data sources 124 may provide data for a particular type of media or for a particular application. For example, one data source 124 may provide data for non-on-demand media (e.g., non-pay and pay-per-view programs), and another may provide data for on-demand media (e.g., VOD programs). Or, for example, a single data source may provide both of these types of data. For example, one data source 124 may provide data for a control application such as an interactive media guidance application. Another data source 124 may, for example, provide data for another interactive application (e.g., a home shopping application, or real-time data such as sports scores, stock quotes, news data and weather data). In some embodiments, data sources 124 may provide data to the control application using a client/server approach. There may be one server per data source, one for all sources or, in some embodiments, a single server may communicate as a proxy between user equipment 110 and various data sources 124. In some embodiments, data sources 124 may provide data as an online interactive media guidance application. In such embodiments, data source 124 may include control circuitry for executing the instructions of the online media guidance application. The data provided by data source 124 may include the start time, end time, and/or title for a given type of media.

FIG. 1 shows media source 120 and data sources 124 as separate elements. In practice, their functionality may be combined and provided from a single system at a single facility, or multiple systems at multiple facilities. For example, one media source 120 and data source 124 may be combined to provide VOD content and associated VOD data.

Figure 2:
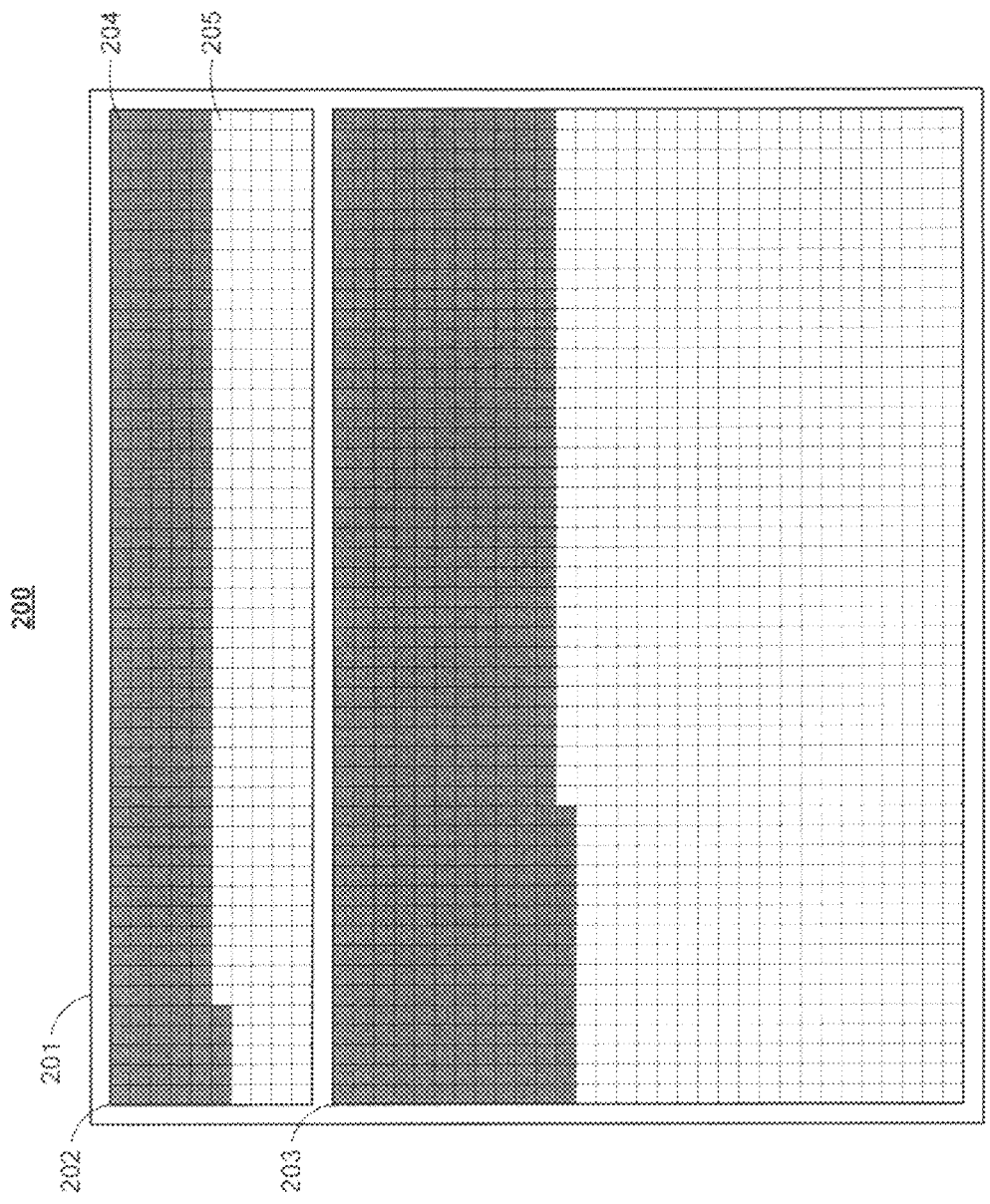
FIG. 2 is a diagram of a separate buffer and recorded video space of a media recorder, in accordance with one embodiment of the present invention.

FIG. 2 shows a diagram of a separate buffer and recorded video space of a media recorder, in accordance with one embodiment of the present invention. In this diagram, the storage device 201 may be media recorder 116 depicted in FIG. 1, or may be a combination of media recorder 116 and the memory of control circuitry 118. Media recorder 116 includes two segments of memory, the buffer 202 and the recorded video space 203. The buffer may be comprised of a portion of media recorder 116, some or all of the memory of control circuitry 118, or a combination thereof. It should be noted that the relative sizes of the buffer and the recorded video space in FIG. 2 have been chosen for purposes of illustration only and are not meant to illustrate a preferred ratio.

Segments may be any grouping of storage space, including but not limited to areas or partitions of the same memory device, or separate memory devices (e.g., separate hard disk drives). In each segment there are storage blocks depicted, some of which represent used storage blocks 204 and some of which represent free storage blocks 205. In this embodiment, when the buffer 202 is full (and assuming the control application has been configured to cause the media recorder 116 to record when the buffer becomes full), the buffered video will be copied to the recorded video space 203 and the newly received video will be recorded to the recorded video space 203.

Figure 3:
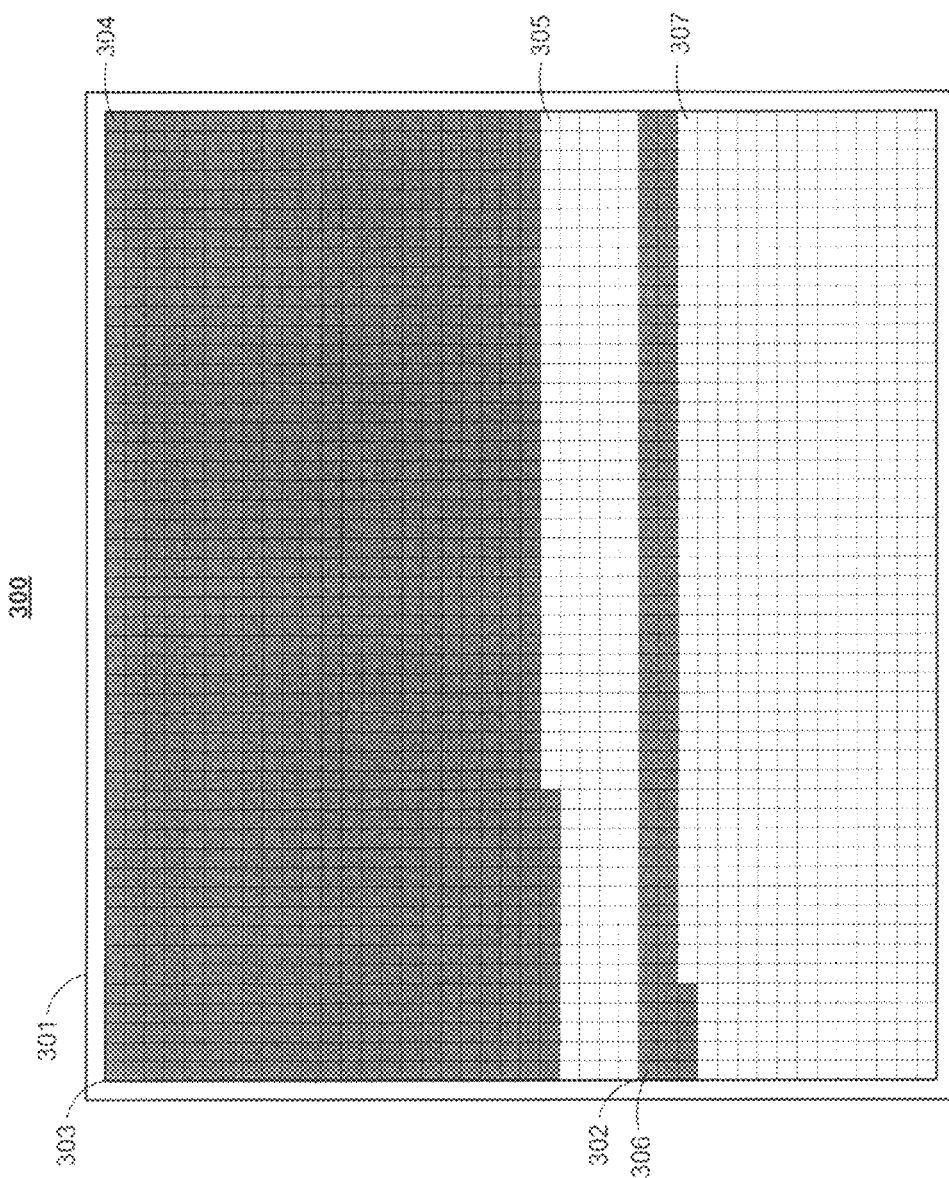
FIG. 3 is a diagram of a commingled buffer and recorded video space of a media recorder, in accordance with one embodiment of the present invention.

FIG. 3 shows a commingled buffer and recorded video space of a media recorder, in accordance with another embodiment of the present invention. In this diagram, the storage device 301 is a part of media recorder 116 depicted in FIG. 1. Storage device 301 is comprised of storage blocks, some of which are presently allocated to recorded programs (i.e., recorded video space 303), and some of which are presently allocated to buffer 302. Likewise, storage device 301 has some storage blocks which are used 304, and some which are free 305. In this depiction, the buffer 302 has been allocated storage blocks beginning with storage block 306 and ending with storage block 307. In some embodiments, when the buffer is full, the storage blocks 306 to 307 may be designated as a recording (i.e., as further recorded video space) and a different range of storage blocks may be allocated for a new buffer. In other embodiments, when the buffer is full, the contents of storage blocks 306 to 307 may be copied to another range of storage blocks, and storage blocks 306 to 307 may remain allocated to the buffer. In still other embodiments, the contents of storage blocks 306 to 307 may be copied to another range of storage blocks, and a different range of storage blocks may be allocated for the new buffer. Other storage and pointer management techniques, as would be understood by one skilled in the art, would be considered within the scope and intent of the present invention as well.

Figure 4:
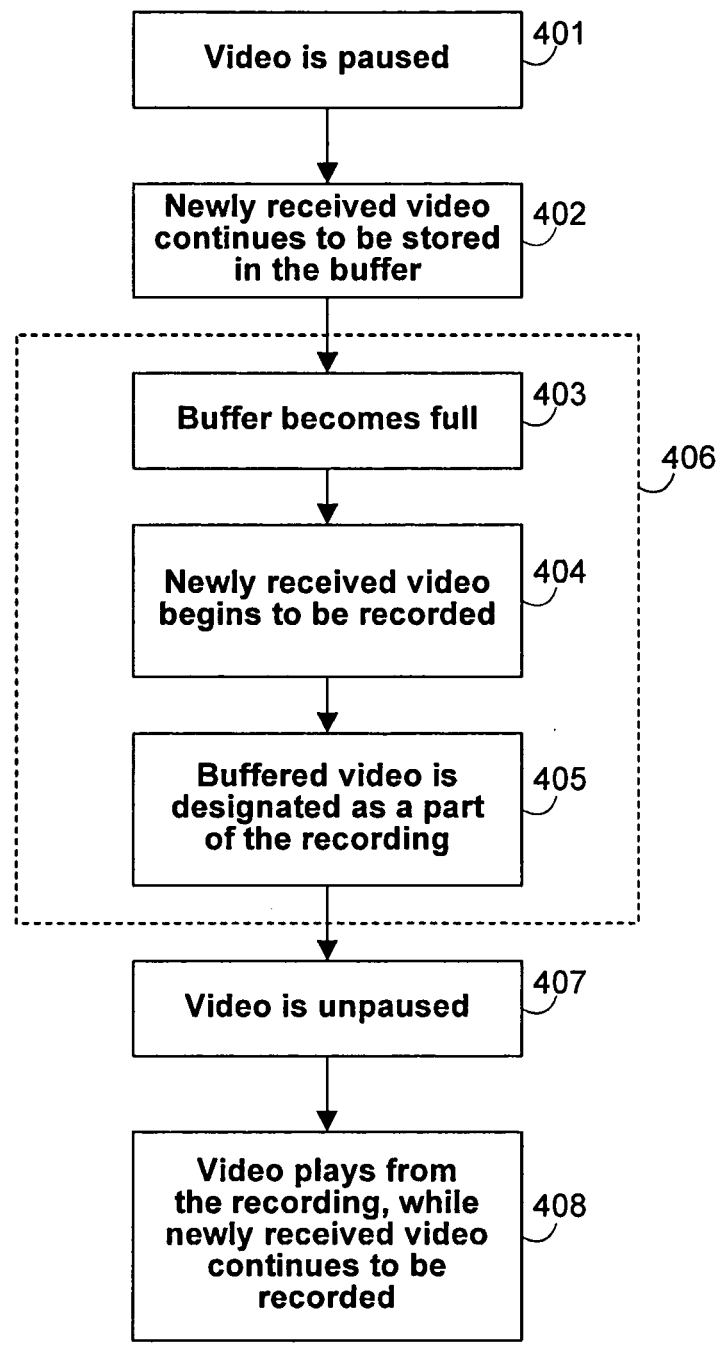
FIG. 4 shows a flow chart of an illustrative process for buffering a video while paused, in accordance with one embodiment of the present invention.

FIG. 4 shows a flow chart of an illustrative process for buffering video that is paused and later unpaused. In step 401, the video is paused, and the ensuing newly received video continues to be buffered in step 402. In this example, the program is paused long enough that the buffer becomes full 403, at which point the newly received video begins to be recorded 404 and the contents of the buffer (the "buffered video") are designated as a part of the recording 405. In so designating, the buffer contents are tagged as logically preceding the newly received video that is being recorded. When the video is unpaused 407, the video resumes playing from the same point at which it was paused, and plays from the recorded video space while the ensuing newly received video continues to be recorded.

It should be noted that steps 404 and 405 may be reversed, such that the control application first designates the buffered video as a recording, and subsequently begins recording the newly received video to that recording. Likewise, steps 404 and 405 may be performed simultaneously without departing from the scope of the invention. Thus, whenever the step of designating the buffered video as a recording and the step of recording the newly received video are discussed as consecutive steps, it should be understood that either step may be performed before the other, or simultaneously with the other.

As used herein, video refers to any video signal which is currently being received by the control application or which is buffered or recorded in the device. Video includes any current broadcast (e.g., a repeat episode of "Seinfeld"), and is not limited to live performances (e.g., a live concert) or new episodes (e.g., a new episode of "Seinfeld"). Likewise, any video which is being currently broadcast will be video for the purposes of this invention regardless of whether the broadcast is subject to a "tape delay." In addition, any non-broadcast video that is simultaneously received, buffered, and displayed by the control application may be video for the purposes of this invention, including on-demand programming, internet protocol television (IPTV), and switched digital video programming.

It should be noted that the term video has been used only as a matter of convenience, and that this invention may be similarly applied to any signal which a control application may receive, regardless of whether that signal is comprised of audio, video, or both.

Figure 5:
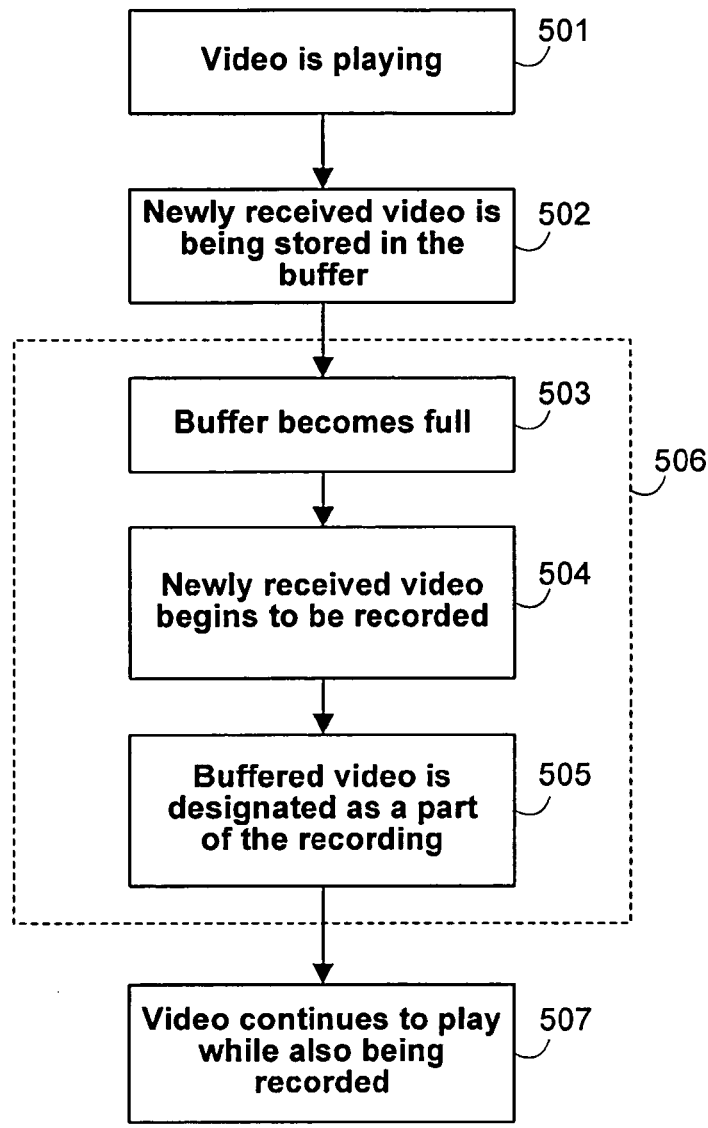
FIG. 5 shows a flow chart of an illustrative process for buffering a video while playing, in accordance with one embodiment of the present invention.

FIG. 5 shows a flow chart of an illustrative process for buffering video while it is playing. This illustration is also applicable to video which has been paused and later unpaused prior to the buffer full condition being met (e.g., slightly delayed playback). In step 501, the video is playing (e.g., the video is not paused, and the video is being output to some form of display device as shown in FIG. 1, 112). In some cases, the video that is being played may be being retrieved from the buffer (for example, some control applications buffer all video prior to outputting to the display device). At the same time, the newly received video is also being buffered in step 502. In this example, the video is played long enough that the buffer becomes full 503, at which point the ensuing newly received video begins to be recorded 504 and the buffered video is designated as a part of the recording 505. In so designating, the buffered video is tagged as logically preceding the newly received video which is being recorded. In step 507, the video continues to play, while also being recorded. At any time after step 505, if a pause, fast forward, or rewind command were to be received by the control application, the video would continue to be recorded while the command would be executed on the video that has already been recorded (and/or designated as a recording).

Figure 6:
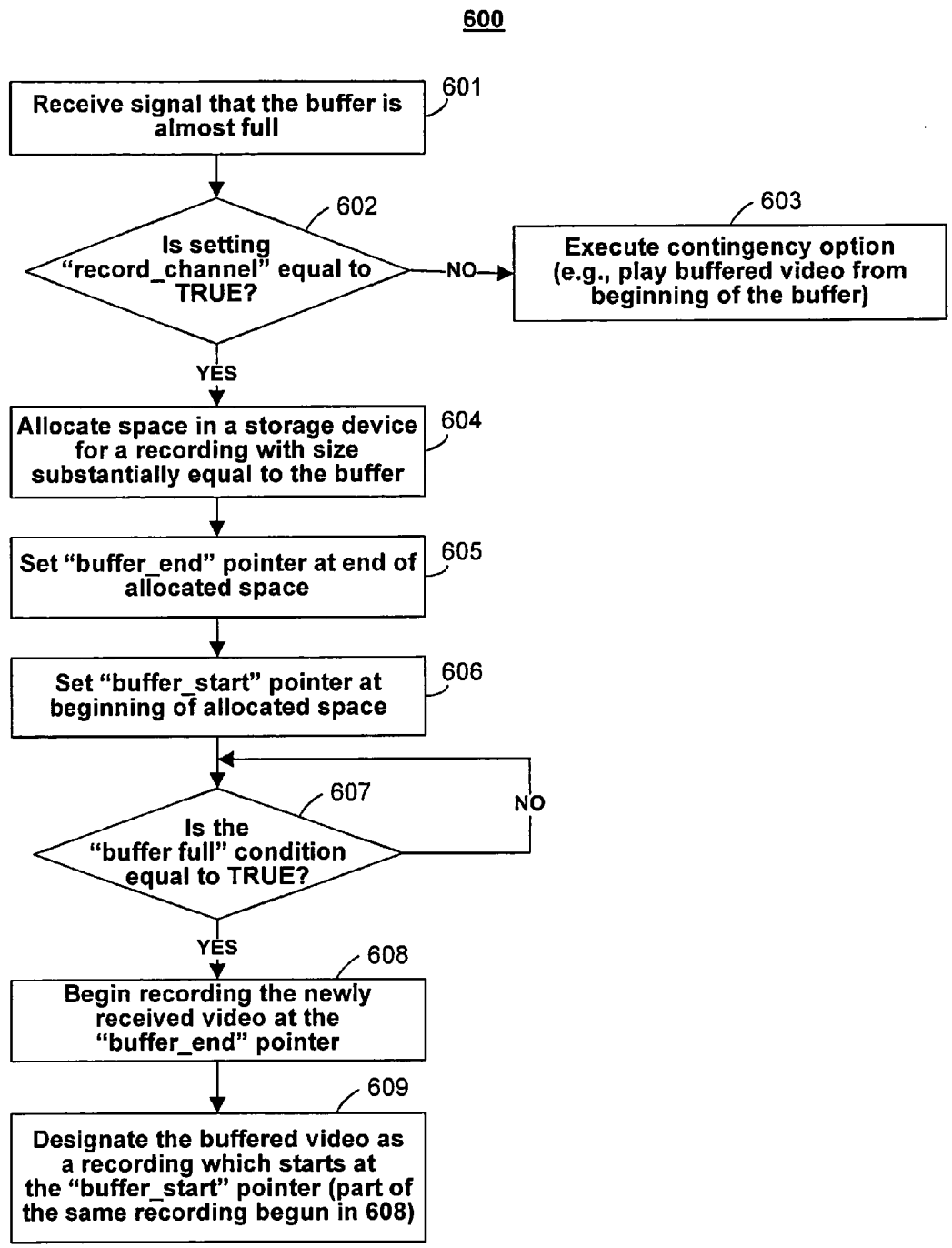
FIG. 6 shows a flow chart of an illustrative process for transitioning from buffering a video to recording the video, in accordance with one embodiment of the present invention.

FIG. 6 shows a flow chart of an illustrative process for transitioning from buffering a video to recording the video, in accordance with one embodiment of the present invention. FIG. 6 illustrates a more detailed embodiment of steps 403-405 and 503-505 of FIGS. 4 and 5, respectively (labeled as 406 and 506). In step 601, the control application receives a signal that the buffer is almost full. In step 602, the control application checks whether the "record_channel" setting is equal to "TRUE." If the "record_channel" setting is not "TRUE," the control application may execute a contingency option 603 such as playing the buffered video from the beginning of the buffer, or any other suitable contingency option. However, if the "record_channel" setting is "TRUE," then the control application allocates space in the media recorder 116 for a recording of a size substantially equal to the buffer 604. After the space is allocated, the control application sets a "buffer_end" pointer at the end of the allocated space 605, and sets a "buffer_start" pointer at the beginning of the allocated space 606. In step 607, the control application waits for the "buffer full" condition to be "TRUE." When the "buffer full" condition is "TRUE," the control application causes the media recorder 116 to begin recording the newly received video at or directly following (e.g., in some cases linked in as in linked list memory management schemes) the "buffer_end" pointer 608, and designates the buffered video as a recording which starts at the "buffer_start" pointer 609. In step 609, as above, the buffered video (beginning at the "buffer_start" pointer) is designated as part of the same recording begun in step 608 which includes the newly received video. And, as above, the buffered video is tagged as logically preceding the newly received video which began being recorded in step 608.

As already mentioned above, the term "full" as used herein may mean anything greater than 50 percent full, up to and including 100 percent full. Thus, in some embodiments, the "buffer full" condition may be activated (i.e., may be "TRUE") prior to the buffer becoming 100 percent full, and may obviate the need for a signal that the buffer is "almost full" as recited in Step 601. In such a case, step 601 may be replaced with step 607, and step 606 would lead directly to step 608.

It should also be noted that it may not be possible to predict precisely when the buffer will be 100 percent full. As a result, the buffer full condition may be triggered prior to the buffer becoming 100 percent full (as already explained above), and therefore the space allocated for the recording may also be different than that of the buffer. Other factors may also cause the size of the allocated space to be insubstantially different from that of the buffer. For example, the buffer may use a different file allocation table than does the media recorder 116 in which the recording space is allocated in step 602. Thus, step 602 uses the term "substantially equal" rather than the term "equal."

It should also be noted that in some cases, the buffer may not become full until after several programs have been buffered. For example, a user might pause during an episode of "Seinfeld," but the buffer may become full only after the following program (an episode of "The Simpsons") has begun to be buffered in addition to the episode of Seinfeld. In such a case, when the buffer full condition is met, the control application may be configured to detect program boundaries and create separate recordings for each program that has been buffered. Additionally, after the buffer has become full and the newly received video has begun to be recorded, the control application may detect program boundaries and create separate recordings of each subsequent program that it records. As already mentioned, video may refer to any video signal which is currently being received by the control application, or which is buffered or recorded in the device. As used herein, a program is an entire video show (e.g., episode of "Seinfeld"). A program boundary is the point at which one program ends and the next program begins.

Figure 7:
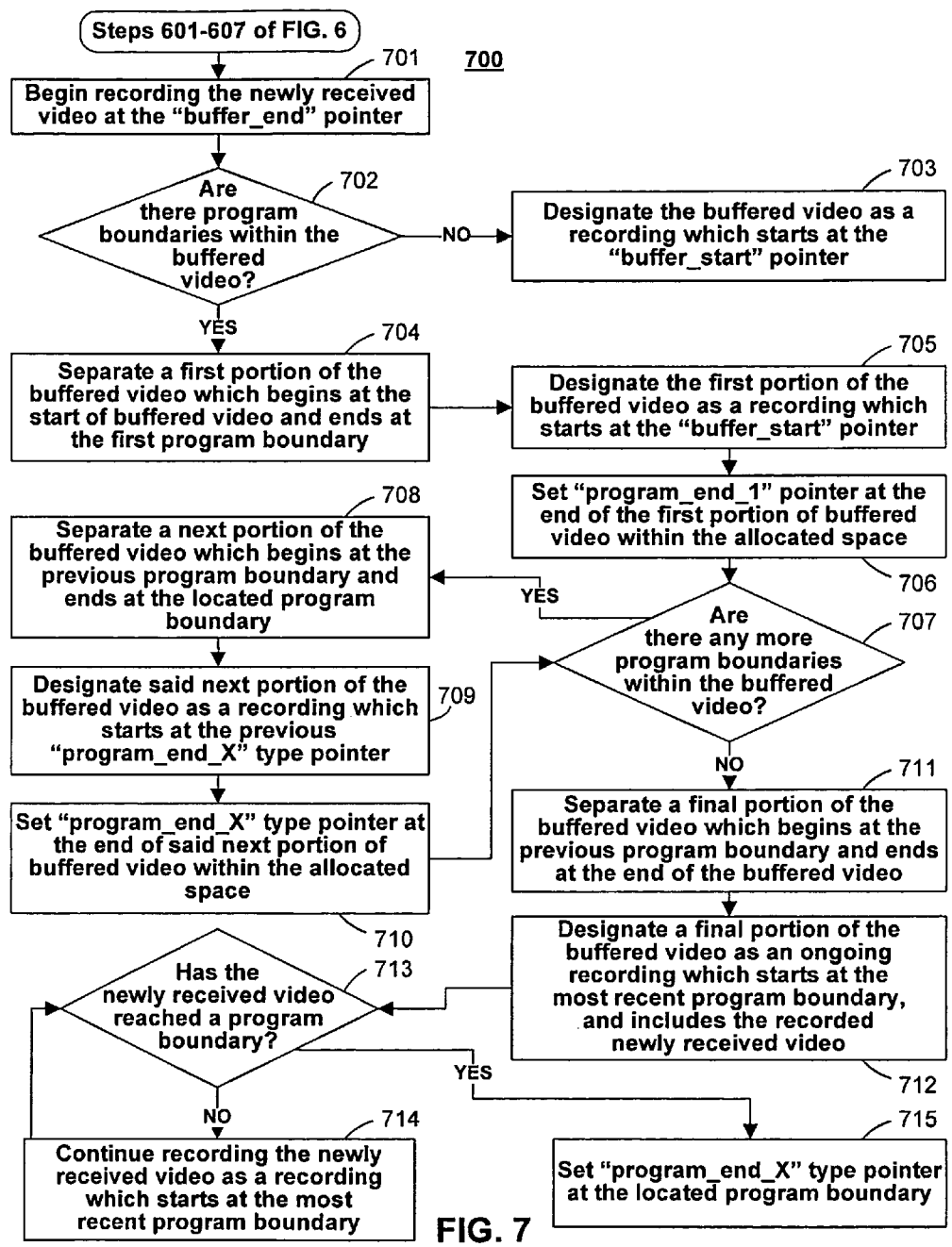
FIG. 7 shows a flow chart of an illustrative process for transitioning from buffering a video to recording the video while creating separate recordings based on program boundaries, in accordance with one embodiment of the present invention.

FIG. 7 shows a flow chart of an illustrative process for transitioning from buffering a video to recording the video while creating separate recordings based on program boundaries, in accordance with one embodiment of the present invention. For the purposes of simplicity, FIG. 7 begins at the point where the "buffer full" condition is equal to "TRUE," and is meant to be preceded by steps 601 to 607 of FIG. 6. In step 701, the control application begins recording the newly received video on the media recorder 116 beginning at the "buffer_end" pointer. Next, the control application determines whether there are any program boundaries within the buffered video 702. If there are no program boundaries within the buffered video 703, the control application designates the buffered video as a recording which starts at the "buffer_start" pointer and which includes the recorded newly received video (as already explained in FIG. 6, step 609).

If there are one or more program boundaries within the buffered video, the control application separates out a first portion of the buffered video 704 which begins at the start of the buffered video and ends at the first program boundary. The control application designates that first portion as a recording which starts at the "buffer_start" pointer 705, and sets an "end_program_1" pointer at the end of that first portion within the allocated space 706. The control application then proceeds to check for the next program boundary within the buffered video 707. If the control application locates a next program boundary, it separates a next portion of buffered video which begins at the previous program boundary and ends at the located program boundary 708 (i.e. the program boundary which was located in step 707). The control application then designates said next portion of video as a recording which starts at the previous "end_program_X" type pointer 709 (in this case, "end_progam_1"), and sets a new "end_program_X" type pointer (in this case, "end_program_2") at the end of said next portion of video in the allocated space 710. The control application then repeats this process of searching for the next program boundary (step 707), separating a next portion of the buffered video (step 708), designating said portion as a separate recording (step 709), and setting a new "end_program_X" type pointer at the end of said portion (step 710), until no more program boundaries exist within the remaining buffered video. At that point, the control application separates a final portion of the buffered video which begins at the previous program boundary and ends at the end of the buffered video 711. The control application designates that final portion as an ongoing recording which starts at the most recent "end_program_X" type pointer, and which includes the recorded newly received video 712. Thus, the final portion of buffered video is combined with the video previously recorded following the last program boundary as well as that newly received video which is currently being recorded. The control application then begins a loop where it checks to see if the newly received video has reached a program boundary 713. Until the newly received video reaches a program boundary, the control application continues to record the newly received video on the media recorder 714. When a program boundary is reached within the newly received video, the control application sets a "program_end_X" type pointer at the located program boundary 715.

In some embodiments, the control application may continue (after step 715) to record the ensuing newly received video as a new recording until it finds the next program boundary in a manner similar to that already demonstrated. In other embodiments, the control application may treat step 714 as a recording end condition, and after setting the program_end_X type pointer in step 715, may clear the buffer and return to buffering the ensuing newly received video. In still other embodiments, after step 715, the control application may be set to make separate recordings of a predetermined number of additional programs, and then return to buffering. In the latter example, if the control application is set to record one additional program after step 715, the control application would treat the next program boundary as a recording end condition.

Likewise, where there are no program boundaries in the buffered video (step 703), the control application may be configured to search for the next program boundary in the newly received video and create a recording from the buffered video and newly received video. At that point, as above, the control application may be configured to continue creating separate recordings of each next program within the newly received video, to clear the buffer and return to buffering, or to make separate recordings of a predetermined number of additional programs and then return to buffering.

In all cases, whenever the control application locates the end of a program presently being recorded (e.g., in the newly received video) or being designated as a recording (e.g., in the buffered video), an entry for the recorded program may be entered into a recorded programs list.

Figure 8:
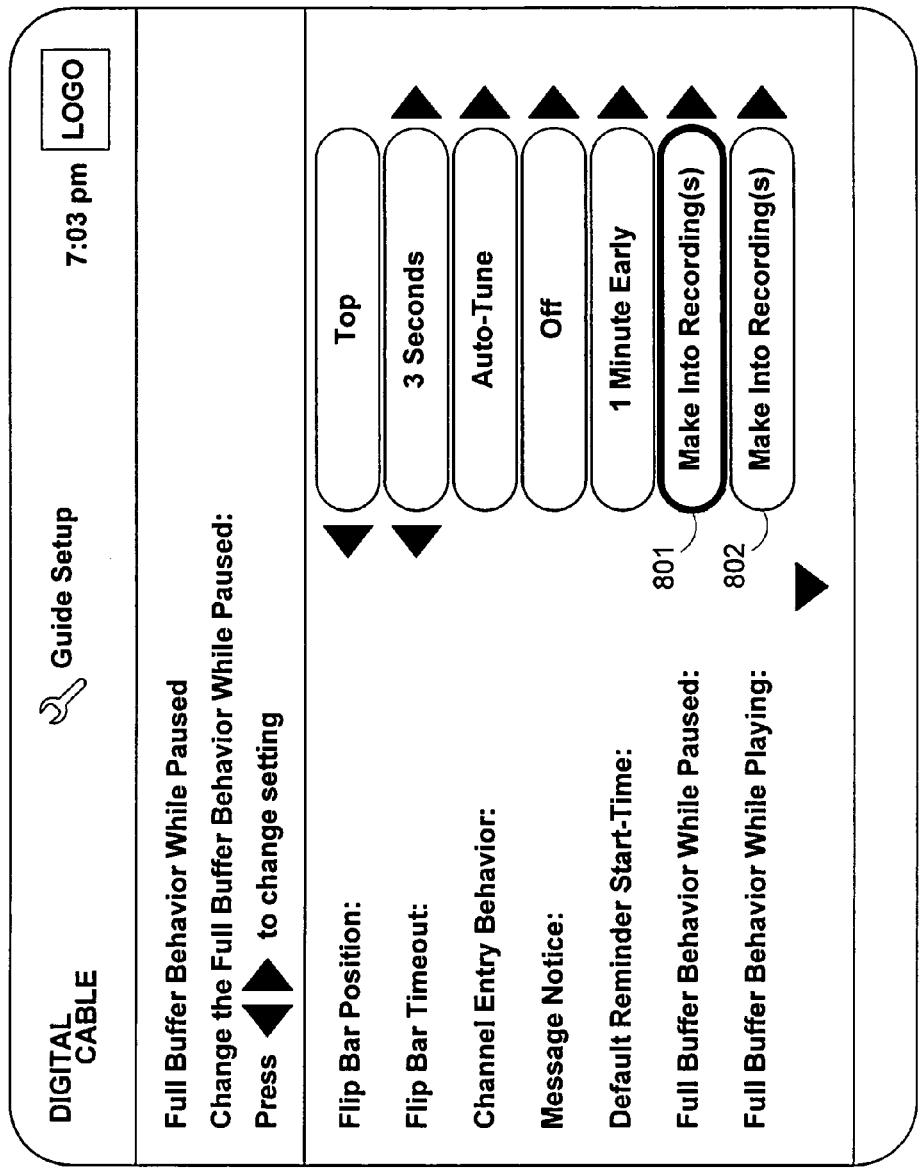
FIG. 8 shows an illustrative Guide Setup display screen, in accordance with one embodiment of the present invention.
Figure 9:
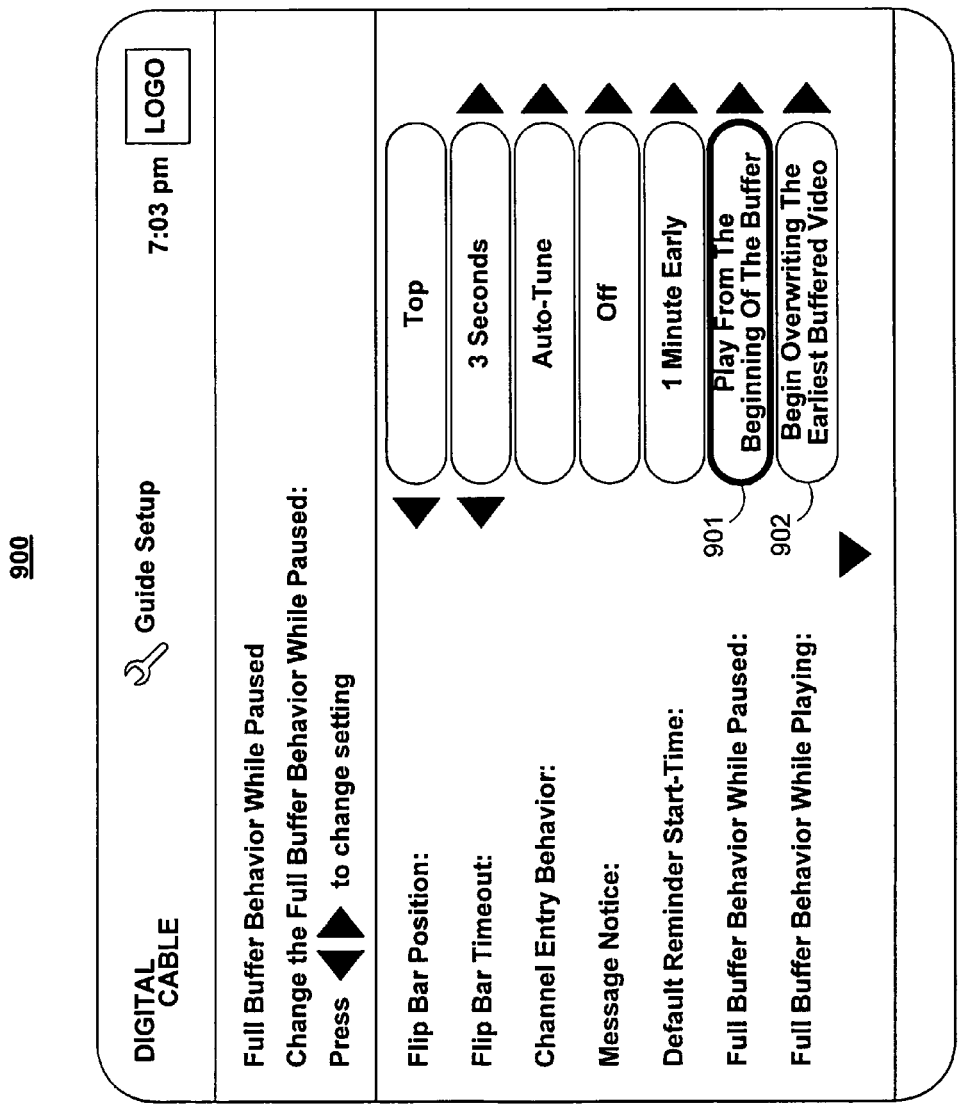
FIG. 9 shows an illustrative Guide Setup display screen, in accordance with one embodiment of the present invention.

FIGS. 8 and 9 show an illustrative Guide Setup display screen, in accordance with one embodiment of the present invention. The Guide Setup display screens in FIGS. 8 and 9, as well as the screens and overlays of FIGS. 10-18, are those of an interactive media guidance application. In these examples (FIGS. 8-18) the functions of the control application are to be performed (or have been performed, as in FIG. 18) by the interactive media guidance application (which is a type of control application).

In FIG. 8, the "Full Buffer Behavior While Paused" setting 801 is selected, and is set to begin recording the newly received video and to designate the buffered video as a recording (or multiple recordings if the control application is set to recognize program boundaries as discussed in FIG. 7) when the buffer full condition is received by the control application. Similarly, the "Full Buffer Behavior While Playing" setting 802 is also set to begin recording the newly received video and to designate the buffered video as a recording (or recordings, as above) when the buffer full condition is received by the control application.

In FIG. 9 the "Full Buffer Behavior While Paused" option 901 is also selected, but is set to play from the beginning of the buffer when the buffer is full (a "contingency option"), and therefore not make any recording(s) of the newly received video. Likewise, the "Full Buffer Behavior While Playing" option 902 is set to begin overwriting the earliest buffered video (another "contingency option"), rather than recording the newly received video. It should be understood that a single "Full Buffer Behavior" setting may be applied to all buffer full conditions, rather than having separate settings depending on whether the video is playing or paused (as shown in settings 801 and 802, and settings 901 and 902).

In addition to, or as an alternative to, having separate full buffer behavior settings as shown in settings 801 and 802 (and settings 901 and 902), some embodiments may employ different definitions of when the buffer is "full" depending upon whether the video is paused or playing at the time the buffer becomes full. For example, when the video is paused, the control application may consider the buffer "full" and begin recording only after the buffer has circled back and reached the point at which the video was paused (i.e., the control application has caused to be overwritten all buffered video prior to the point at which the video was paused). However, when the video is playing, the control application may consider the buffer "full" and cause the media recorder 116 to begin recording when the buffer has reached one end, but has not yet circled back (i.e. the control application has not yet caused the buffered video to be overwritten). Some other embodiments may swap the buffer full interpretation between paused and playing cases above. In still other embodiments, the control application may use the same definition of "full" when the video is playing and paused, or may use one or more definitions of "full" not already mentioned.

It should also be understood that it may be desirable to offer one or more additional "Full Buffer Behavior" contingency options. Additional contingency options may be provided without departing from the scope of the invention, and may also be made to depend upon whether the video is paused or playing when the buffer becomes full (and how "full" is defined).

Figure 10:
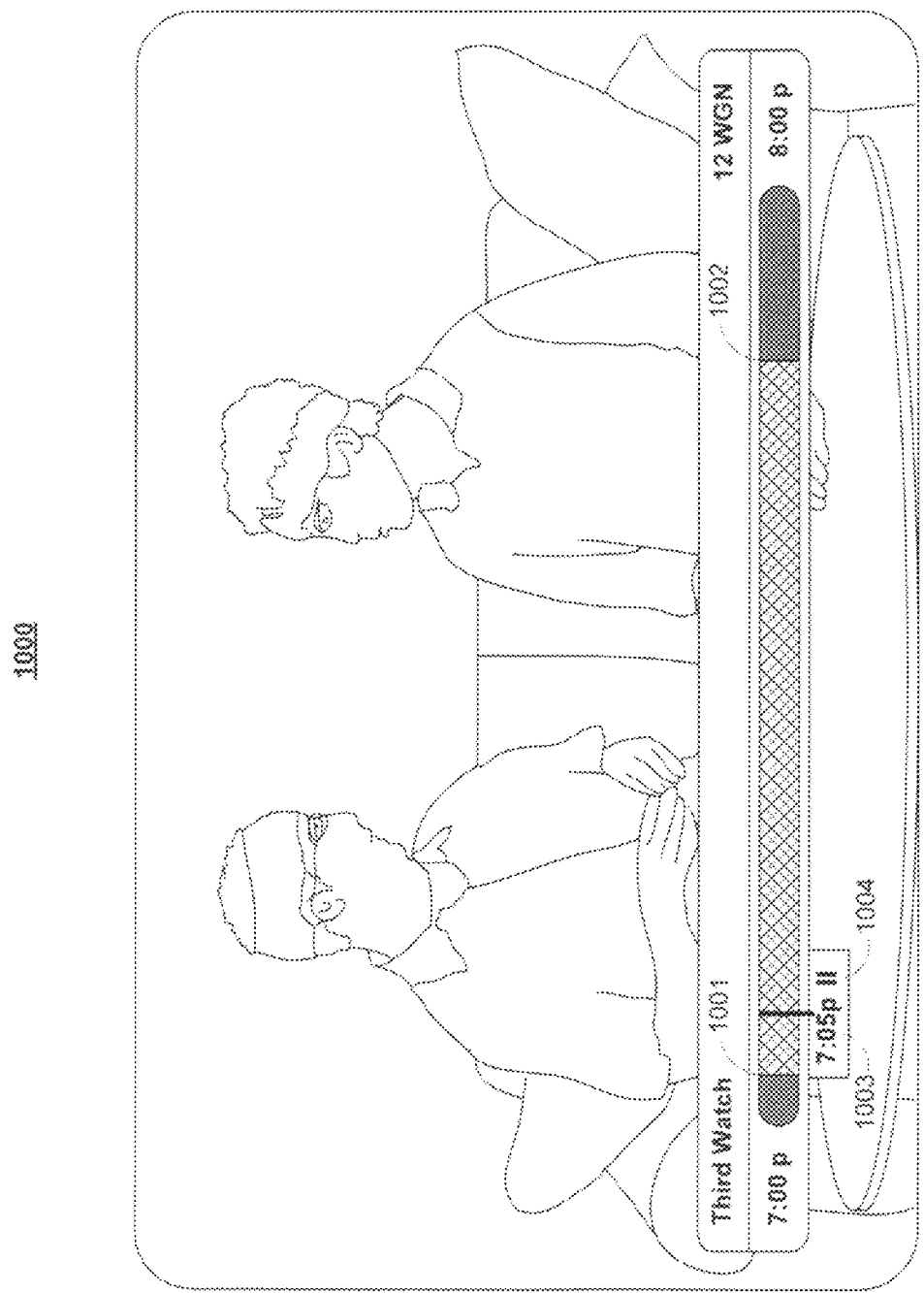
FIG. 10 shows an illustrative display screen showing a transport status bar overlay, in accordance with one embodiment of the present invention.
Figure 17:
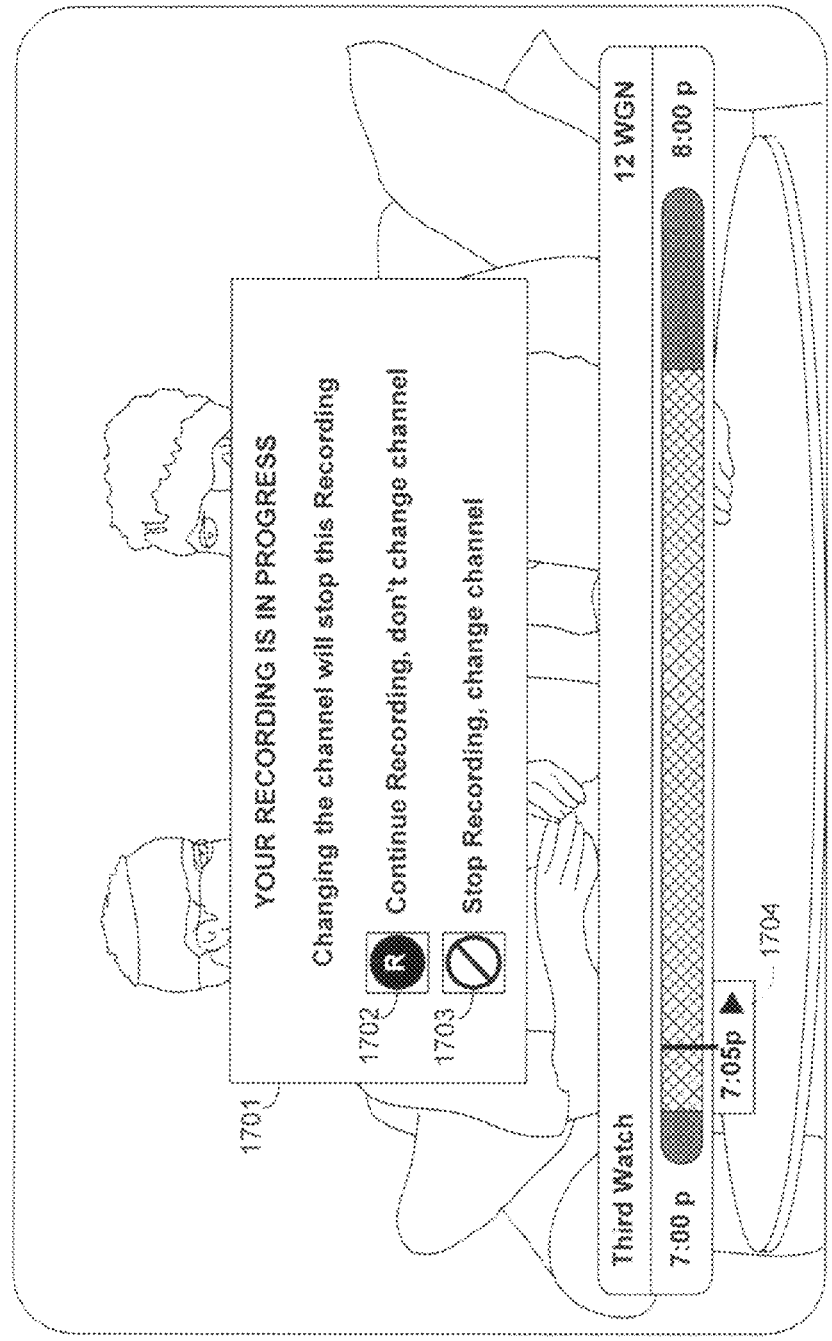
FIG. 17 shows an illustrative display screen showing a dialog box overlay, with user input prompt, activated when the channel is changed during recording, in accordance with one embodiment of the present invention.

FIG. 10 shows an illustrative display screen showing a transport status bar overlay, in accordance with one embodiment of the present invention. The transport status bar shows the name of the video being viewed and buffered ("Third Watch"), and in this case, the channel from which it is being received ("12 WGN"). In FIG. 10, the transport status bar displays a span of one hour from 7:00 pm to 8:00 pm, and graphically depicts the earliest point that has been buffered 1001 and the latest point that has been buffered 1002. It also shows the point at which the program was paused and time at which that frame was originally buffered 1003. In this embodiment, the transport status bar shows a pause symbol 1004 which indicates that the video is currently paused. In another embodiment, the video may be currently playing, in which case the transport status bar would instead show a play symbol (as shown in FIG. 17, 1704) and would indicate the playback point. In some cases, after the video has been paused or playing for a certain period of time, the transport bar may be set to disappear automatically.

Figure 11:
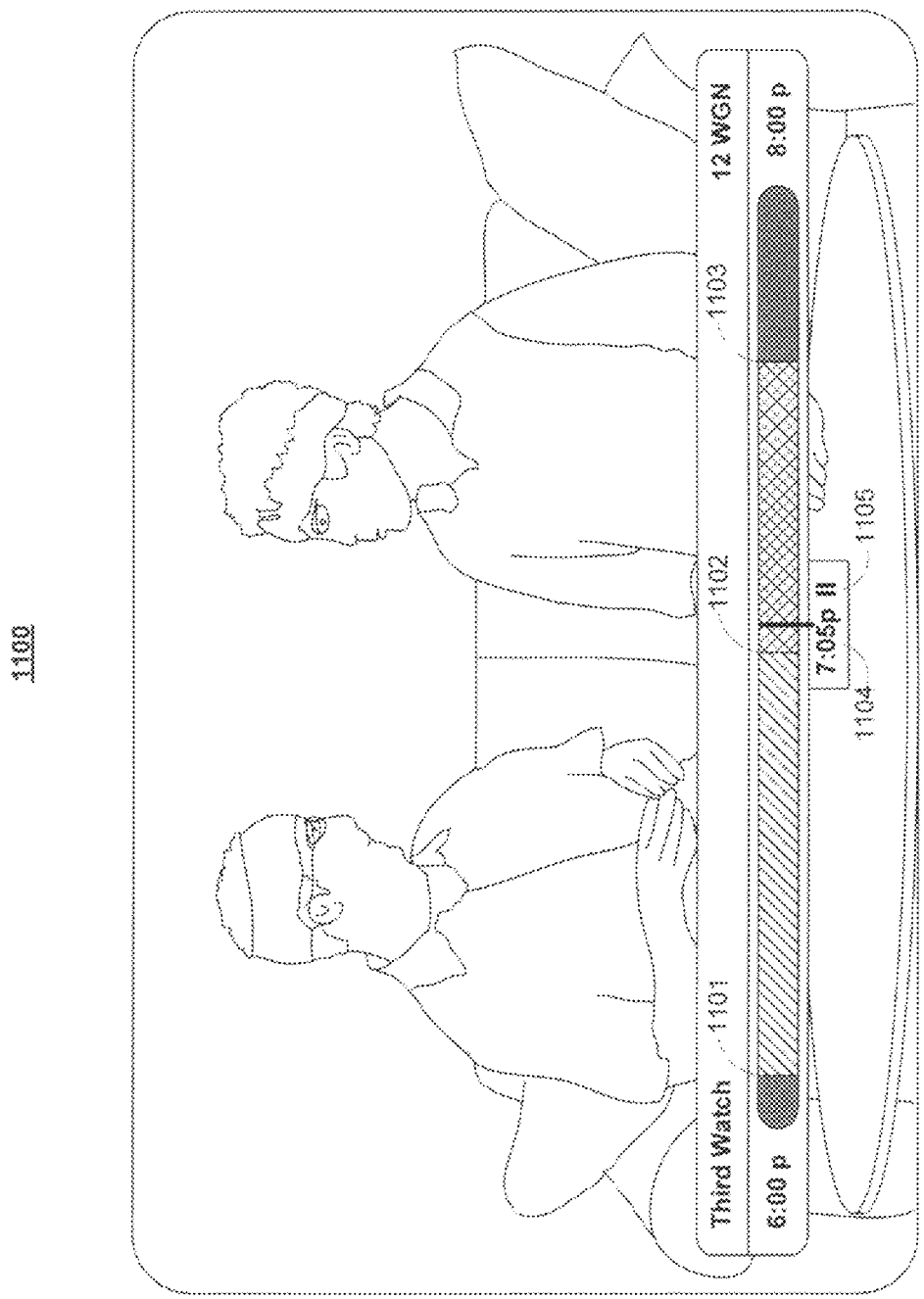
FIG. 11 shows an illustrative display screen showing a transport status bar overlay, in accordance with one embodiment of the present invention.

FIG. 11 also shows an illustrative display screen showing a transport status bar, in accordance with one embodiment of the present invention. FIG. 11 is identical to FIG. 10, except that the transport status bar in FIG. 11 displays a span of two hours from 6:00 pm to 8:00 pm, and graphically depicts portions of two programs which have been buffered. The transport status bar depicts a buffered portion of a first program which begins at point 1101 and ends at point 1102 (a "program boundary"), and a buffered portion of a second program which begins at point 1102 and ends at point 1103. As before, the overlay shows the point of pause 1104 by showing the time at which that frame was originally buffered. In this case, as above, the transport status bar shows a pause symbol 1105 which indicates that the video is currently paused, and shows that the video being viewed and buffered is named "Third Watch" and is being received from channel "12 WGN."

Figure 12:
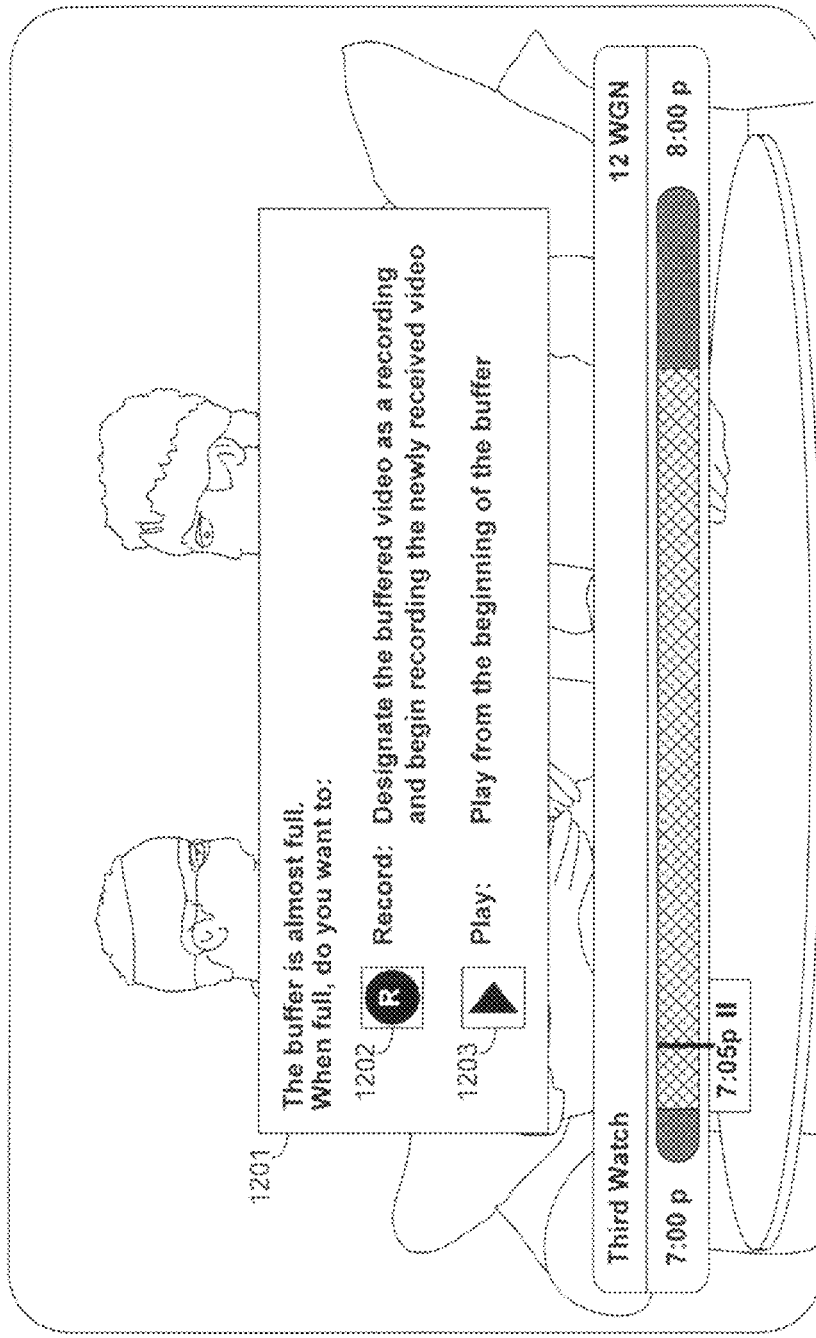
FIG. 12 shows an illustrative display screen showing a dialog box overlay, with user input prompt, activated when the buffer is almost full, in accordance with one embodiment of the present invention.

FIG. 12 shows an illustrative display screen showing a dialog box overlay, with user input prompt, activated when the buffer is almost full, in accordance with one embodiment of the present invention. FIG. 12 shows the same transport status bar depicted in FIG. 10. However, in FIG. 12, the control application has received a signal that the buffer is almost full, and has activated a dialog box overlay with a user input prompt 1201. The user input prompt in this case asks the user to choose either to begin recording the newly received video and designate the buffered video as a recording 1202, or to unpause and play the video from the beginning of the buffer 1203. Here, as above, the term "full" may have one of several definitions, and different definitions may apply based on which option is selected.

Figure 13:
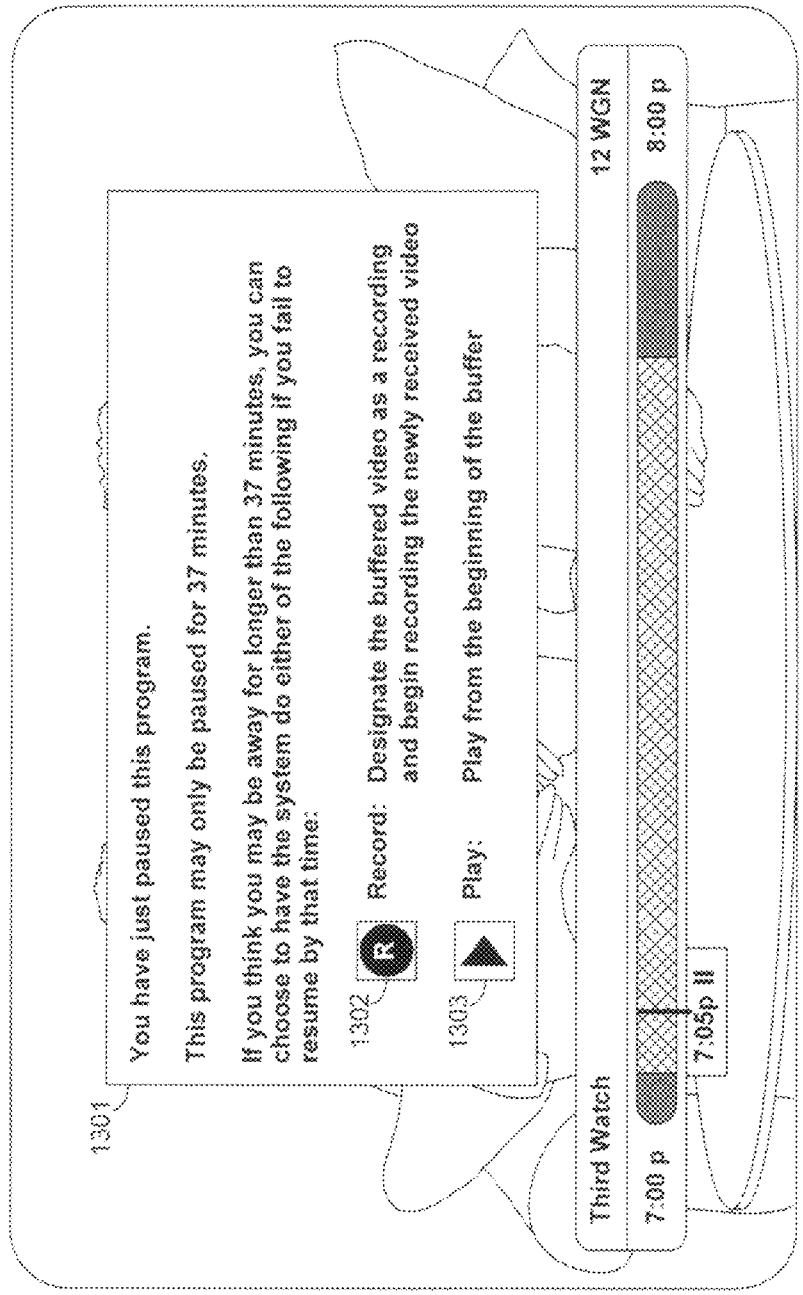
FIG. 13 shows an illustrative display screen showing a dialog box overlay, with user input prompt, activated when the video is first paused, in accordance with one embodiment of the present invention.

FIG. 13 shows an illustrative display screen showing a dialog box overlay, with user input prompt, activated when the video is first paused, in accordance with one embodiment of the present invention. FIG. 13 shows the same transport status bar depicted in FIG. 10. However, in FIG. 13, the control application has activated a dialog box overlay 1301 in response to having received a pause command. In addition to informing the user regarding how long the present video may be paused before some action needs to be taken, the dialog box overlay 1301 has a user input prompt which asks the user to choose either to begin recording the newly received video and designate the buffered video as a recording 1302, or to unpause and play the video from the beginning of the buffer 1303. Here, as above, the term "full" may have one of several definitions, and different definitions may apply based on which option is selected.

Figure 14:
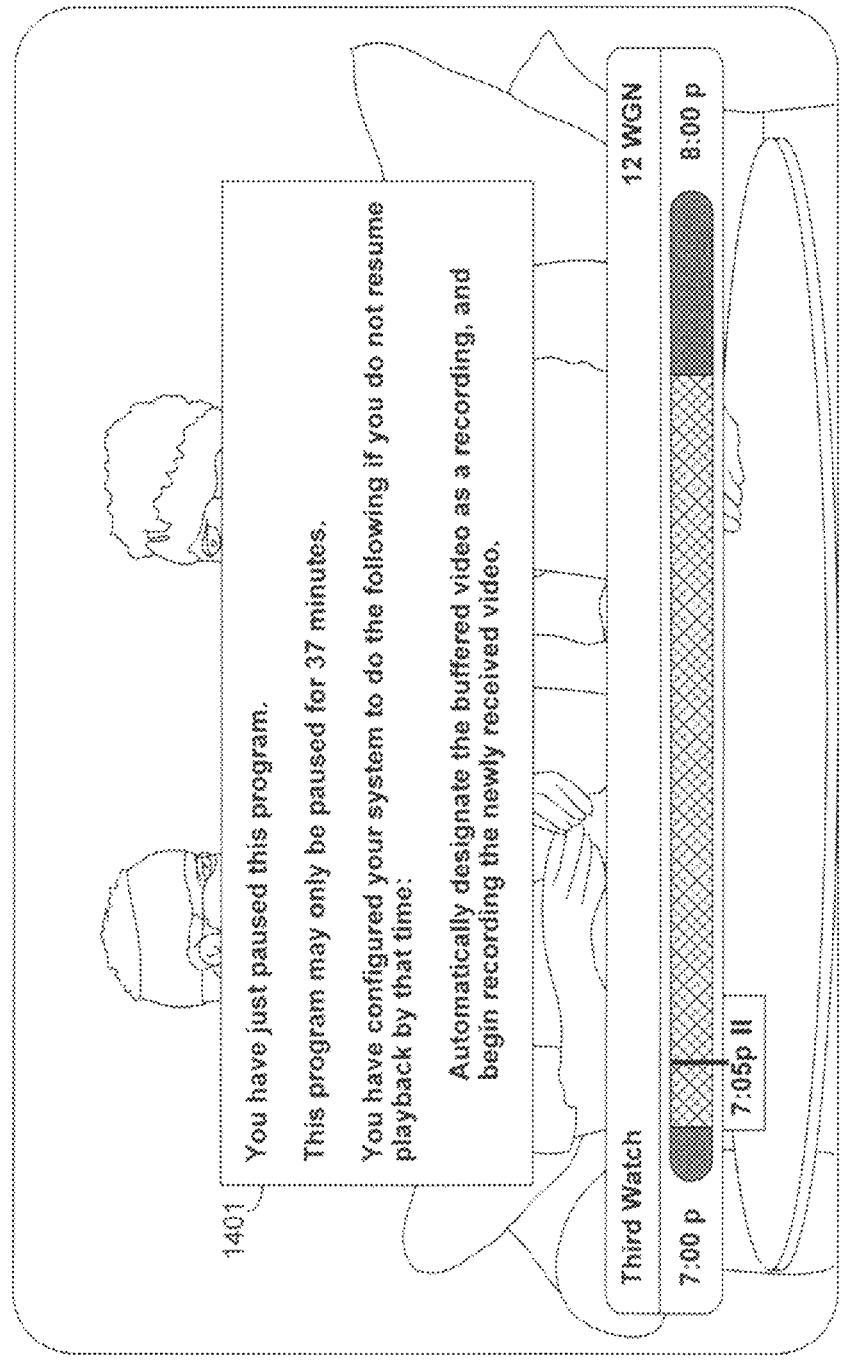
FIG. 14 shows an illustrative display screen showing a dialog box overlay activated when the video is first paused, in accordance with one embodiment of the present invention.

FIG. 14 shows an illustrative display screen showing a dialog box overlay activated when the video is first paused, in accordance with one embodiment of the present invention. FIG. 14 shows the same transport status bar depicted in FIG. 10. However, in FIG. 14, the control application has activated a dialog box overlay 1401 in response to having received a pause command. The dialog box overlay 1401 alerts the user as to how long the video may be paused, and informs the user as to what setup option has been selected (e.g., as set in FIGS. 7 & 8).

In some embodiments, the overlay may display a countdown which periodically or continuously updates the amount of time left before the buffer becomes full. In other embodiments, the overlay 1401 may disappear after a period of time, and may be replaced by another overlay which only displays a countdown which displays the amount of time left before the buffer becomes full.

Figure 15:
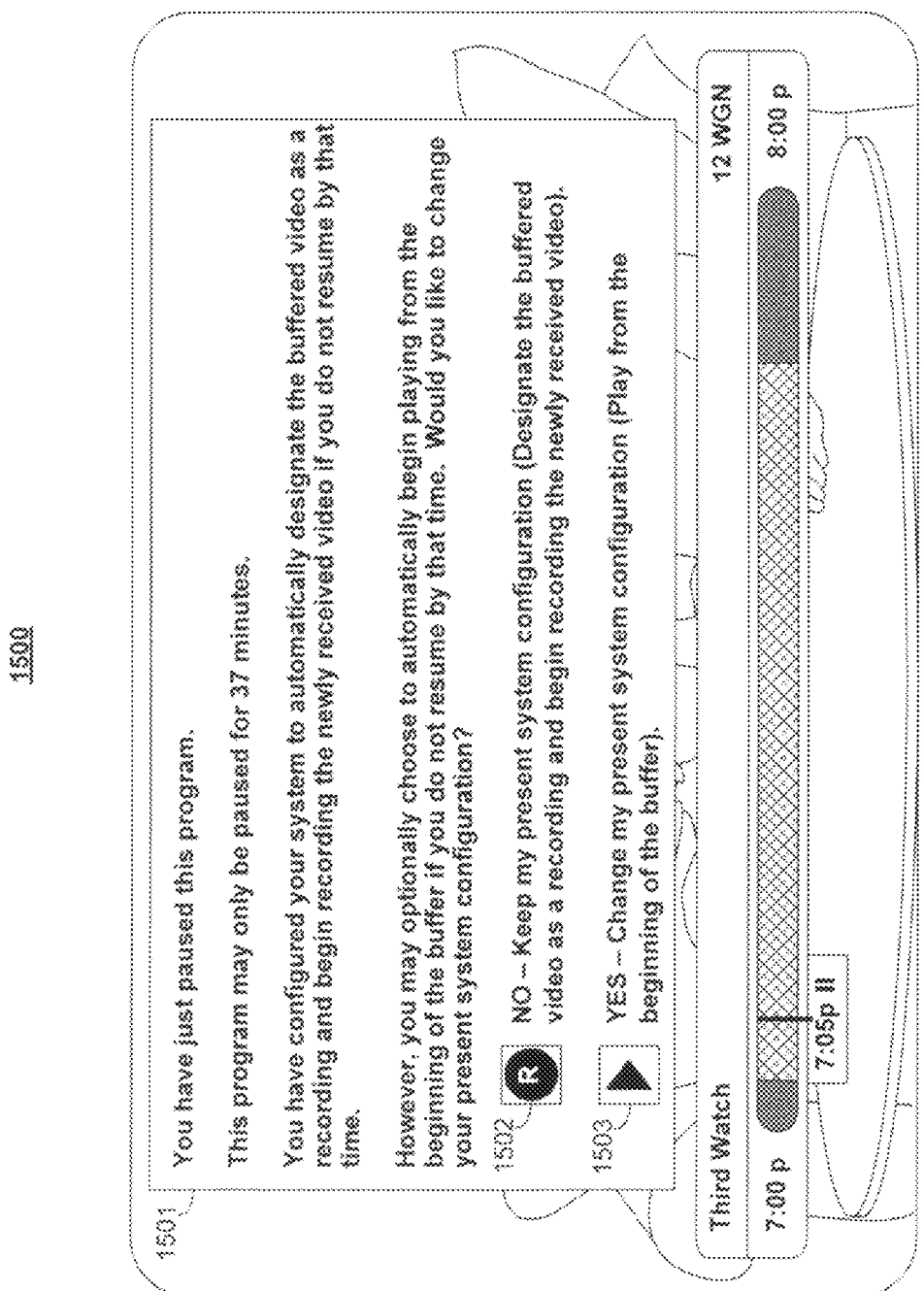
FIG. 15 shows an illustrative display screen showing a dialog box overlay, with user input prompt, activated when the video is first paused, in accordance with one embodiment of the present invention.

FIG. 15 shows an illustrative display screen showing a dialog box overlay, with user input prompt, activated when the video is first paused, in accordance with one embodiment of the present invention. FIG. 15 shows the same transport status bar depicted in FIG. 10. However, in FIG. 15, the control application has activated a dialog box overlay 1501 in response to having received a pause command. The dialog box overlay 1501 alerts the user as to how long the video may be paused, and informs the user as to what setup option has been selected (e.g., as set in FIGS. 7 & 8). In addition, the dialog box overlay 1501 has a user input prompt which asks the user whether he or she wants to keep the present setup option 1502 (to begin recording the newly received video and designate the buffered video as a recording), or to change the setup option 1503 (to unpause and play the video from the beginning of the buffer) as in FIGS. 7 & 8. Here, as above, the term "full" may have one of several definitions, and different definitions may apply based on which option is selected. Likewise, as above, in some embodiments, the overlay may display a countdown which periodically or continuously updates the amount of time left before the buffer becomes full.

FIG. 16 shows an illustrative display screen showing a dialog box overlay, with user input prompt, activated when the video is first paused, in accordance with one embodiment of the present invention. FIG. 16 is identical to FIG. 15, except that the overlay 1601 gives the user the option to either keep the present setup option 1602 (to begin recording the newly received video and designate the buffered video as a recording), or to change the setting for this time only 1603 (to unpause and play the video from the beginning of the buffer). In this embodiment, option 1603 does not alter the setup option, which will remain in effect for the next time the buffer becomes full (to begin recording the newly received video and designate the buffered video as a recording).

FIG. 17 shows an illustrative display screen showing a dialog box overlay, with user input prompt, activated when the channel is changed during recording, in accordance with one embodiment of the present invention. The overlay indicates that the video is presently being recorded (while it is being played 1704) and that changing the channel will stop the recording 1701. In some embodiments, the control application may have more than one tuner. In such embodiments, the overlay 1701 may only display in circumstances where the other tuners are also being used to record other programs. The overlay gives the user the option to cancel the channel change request and continue recording 1702, or to go forward with the channel change request and stop recording 1703.

Figure 18:
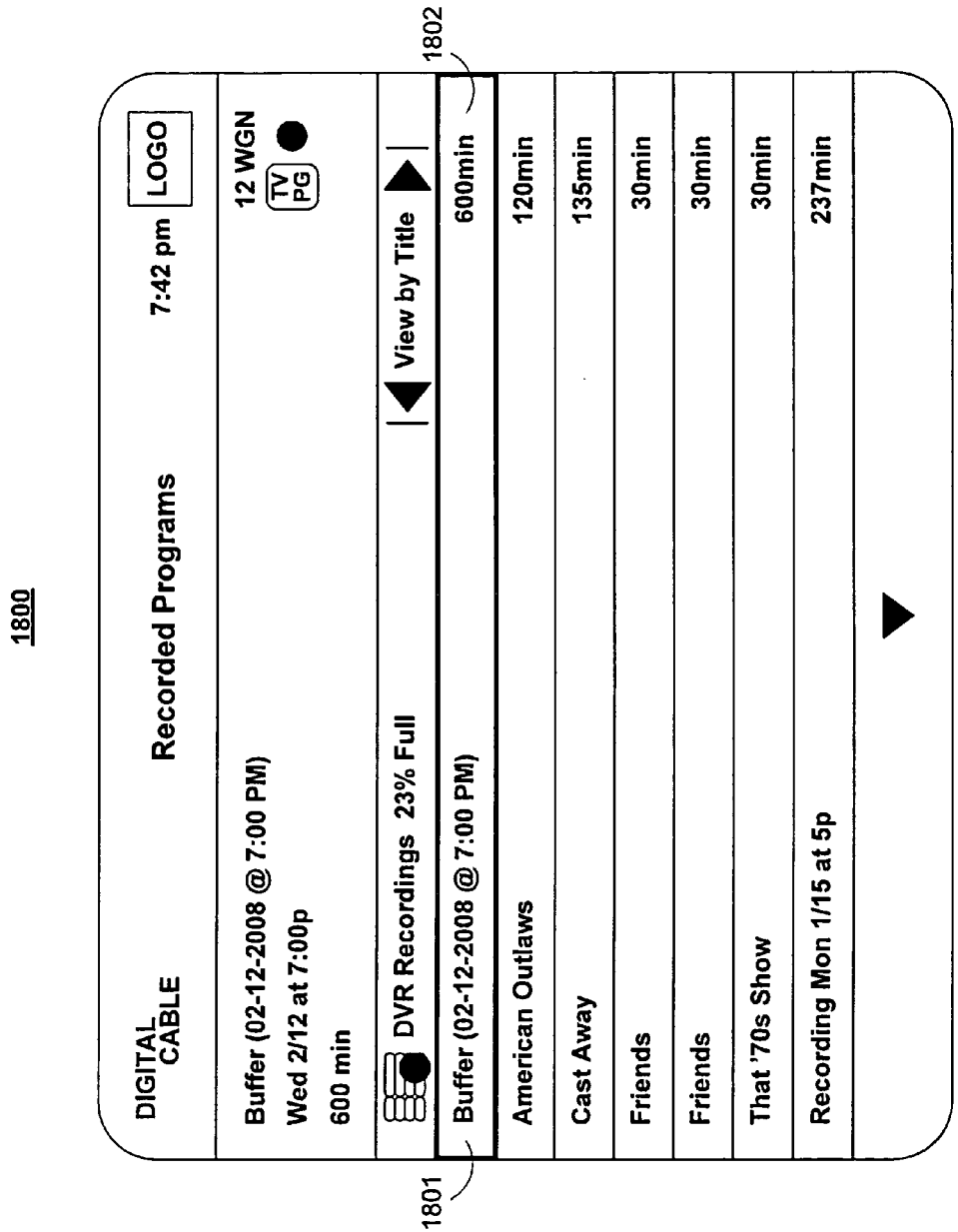
FIG. 18 shows an illustrative Recorded Programs display screen, in accordance with one embodiment of the present invention.

FIG. 18 shows an illustrative Recorded Programs display screen, in accordance with one embodiment of the present invention. In this case, the control application began buffering the video depicted in FIG. 10 ("Third Watch" at 7:00 PM on February 12th), and then later began recording when the buffer became full. In FIG. 18, the Recorded Programs display screen shows lists a video at 1801 under the name "Buffer (02-12-2008 @ 7:00 PM)," so as to convey that the video was recorded when the buffer overflowed on February 12th, and that the earliest data in the recording began at 7:00 PM. The display screen also shows the length of the recording 1802, which in this case is 600 minutes (or 10 hours).

It should be understood that the naming convention used here ("Buffer (02-12-2008 @ 7:00 PM)") is only for the purposes of illustration, and that any suitable naming convention may be used. In embodiments where the control application is configured to detect program boundaries and create separate recordings (e.g., FIG. 7), the original name of the program may be suitable (e.g. "Third Watch"). In those embodiments, recordings made from the buffer may be indistinguishable from those which are recorded conventionally (e.g., recordings which were scheduled or commenced as a result of the user pressing the record button).

In some embodiments, the Recorded Programs display screen may provide information indicating whether the program was recorded conventionally or as a result of the buffer becoming full. In other embodiments, the control application may have a separate display screen for videos that were recorded as a result of the buffer becoming full.

The above described embodiments of the present invention are presented for purposes of illustration and not of limitation, and the present invention is limited only by the claims which follow. Furthermore, all of the flow charts and processes described above are illustrative. Steps may be added or removed to any of the flow charts, and steps may be performed in a different order.

What is claimed is:

1. A method for managing the buffering of video, comprising:
   receiving video;
   buffering the video in a playback control buffer memory;
   detecting, using control circuitry, a buffer full condition of the playback control buffer memory; and
   in response to detecting the buffer full condition:
      automatically recording newly received video to a hard drive, distinct from the memory, as a recording without overwriting previously buffered video in the buffer memory; and
      designating the buffered video as a part of the recording.

2. The method of claim 1, further comprising:
   in response to receiving a user playback control command for the video after detecting the buffer full condition, performing the playback control for the video from the recording.

3. The method of claim 1, further comprising:
receiving a setup option, the value of which indicates whether or not said response to detecting the buffer full condition should be performed; and
performing said response to detecting the buffer full condition only if the setup option so indicates.

4. The method of claim 3, further comprising alerting a user to the value of the setup option.

5. The method of claim 1, further comprising:
receiving a user input, the value of which indicates whether or not said response to detecting the buffer full condition should be performed; and
performing said response to detecting the buffer full condition only if the user input so indicates.

6. The method of claim 1 wherein recording newly received video as a recording comprises:
allocating space in the hard drive, the allocated space being substantially equal to the size of the buffer memory;
setting an end pointer to point at a location at the end of the allocated space; and
recording newly received video to the hard drive as a recording, starting substantially at the end pointer; and
wherein designating the buffered video as a part of the recording comprises:
setting a start pointer to point at a location at the beginning of the allocated space; and
designating the buffered video as a part of the recording, starting at the start pointer.

7. The method of claim 1, wherein the step of buffering the video in a playback control buffer memory is initiated in response to receiving a pause command.

8. The method of claim 1, further comprising alerting a user as to the length of time the video may be paused prior to a buffer full condition.

9. The method of claim 1, further comprising alerting a user, prior to a buffer full condition, that the playback control buffer memory is almost full.

10. The method of claim 1, further comprising alerting a user, upon detecting a buffer full condition, that the playback control buffer memory is full.

11. The method of claim 1, wherein recording newly received video to the hard drive as a recording, and designating the buffered video as a part of the recording, further comprises detecting the presence of program boundaries.

12. The method of claim 11, further comprising designating one or more of the programs in the buffered video as separate recordings.

13. The method of claim 11, further comprising:
designating the most recently buffered program in the buffered video as a separate recording; and
recording newly received video to said separate recording until the newly received video reaches a program boundary.

14. The method of claim 11 further comprising:
displaying a graphical indication of program boundaries on a transport status bar.

15. The method of claim 1, further comprising:
detecting a recording end condition; and
in response to detecting the recording end condition, buffering newly received video in a playback control buffer memory.

16. The method of claim 1 wherein the method is performed by an interactive media guidance application implemented on a set-top box.

17. A system for managing the buffering of video comprising:
a media recorder including a hard drive; and
control circuitry configured to:
receive video;
cause the media recorder to buffer the video in a playback control buffer memory;
detect a buffer full condition of the playback control buffer memory; and
in response to detecting the buffer full condition:
cause the media recorder to record newly received video to the hard drive, distinct from the memory, as a recording without overwriting previously buffered video in the buffer memory; and
cause the media recorder to designate the buffered video as a part of the recording.

18. The system of claim 17, further comprising:
a user input device; and
control circuitry configured to:
receive a user playback control command; and
in response to receiving a user playback control command for the video after detecting the buffer full condition, perform the playback control for the video from the recording.

19. The system of claim 17, further comprising control circuitry configured to:
receive a setup option, the value of which indicates whether or not said response to detecting the buffer full condition should be performed; and
cause said response to detecting the buffer full condition to be performed by the media recorder only if the setup option so indicates.

20. The system of claim 19, further comprising:
a display device; and
control circuitry configured to cause the display device to alert a user to the value of the setup option.

21. The system of claim 17, further comprising:
a user input device; and
control circuitry configured to:
receive a user input, the value of which indicates whether or not said response to detecting the buffer full condition should be performed; and
cause said response to detecting the buffer full condition to be performed by the media recorder only if the user input so indicates.

22. The system of claim 17 wherein when causing the media recorder to record newly received video as a recording, the control circuitry is configured to:
cause the media recorder to allocate space in the hard drive, the allocated space being substantially equal to the size of the buffer;
cause the media recorder to set an end pointer to point at a location at the end of the allocated space; and
cause the media recorder to record newly received video to the hard drive as a recording, starting substantially at the end pointer; and
wherein when causing the media recorder to designate the buffered video as a part of the recording, the control circuitry is configured to:
cause the media recorder to set a start pointer to point at a location at the beginning of the allocated space; and
cause the media recorder to designate the buffered video to be a part of the recording, starting at the start pointer.

23. The system of claim 17, further comprising control circuitry configured to cause the media recorder to initiate buffering the video in a playback control buffer memory in response to receiving a pause command.

24. The system of claim 17, further comprising:
a display device; and control circuitry configured to cause the display device to alert a user as to the length of time the video may be paused prior to a buffer full condition.

25. The system of claim 17, further comprising:
a display device; and
control circuitry configured to cause the display device to alert a user, prior to a buffer full condition, that the playback control buffer memory is almost full.

26. The system of claim 17, further comprising:
a display device; and
control circuitry configured to cause the display device to alert a user, upon detecting a buffer full condition, that the playback control buffer memory is full.

27. The system of claim 17, wherein the control circuitry is further configured to detect the presence of program boundaries when causing the media recorder to record newly received video to the hard drive as a recording, and when causing the media recorder to designate the buffered video as a part of the recording.

28. The system of claim 27, further comprising control circuitry configured to cause the media recorder to designate one or more of the programs in the buffered video as separate recordings.

29. The system of claim 27, further comprising control circuitry configured to:
cause the media recorder to designate the most recently buffered program in the buffered video to be a separate recording; and
cause the media recorder to record newly received video to said separate recording until the newly received video reaches a program boundary.

30. The system of claim 27 further comprising:
a display device; and
control circuitry configured to cause the display device to display a graphical indication of program boundaries on a transport status bar.

31. The system of claim 17, further comprising control circuitry configured to:
detect a recording end condition; and
in response to detecting the recording end condition, cause the media recorder to buffer newly received video in a playback control buffer memory.

32. The system of claim 17 wherein the control circuitry is an interactive media guidance application implemented on a set-top box.

* * * * *